United States Patent
Liedtke et al.

(10) Patent No.: US 12,001,826 B2
(45) Date of Patent: Jun. 4, 2024

(54) DEVICE FIRMWARE UPDATE TECHNIQUES

(71) Applicant: Intel Corporation, Santa Clara, CA (US)

(72) Inventors: Kevin Liedtke, Portland, OR (US); James R. Hearn, Hillsboro, OR (US); Scott P. Dubal, Oregon City, OR (US); Jeffery Oliver, Oregon City, OR (US); Patrick J. Mclaughlin, Wilsonville, OR (US); Sharada Ashok Shiddibhavi, Hillsboro, OR (US); Daniel K. Osawa, Tigard, OR (US); Kelly J. Couch, Beaverton, OR (US); Maciej Plucinski, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 16/858,504

(22) Filed: Apr. 24, 2020

(65) Prior Publication Data
US 2020/0257518 A1   Aug. 13, 2020

(51) Int. Cl.
*G06F 9/44*    (2018.01)
*G06F 8/65*    (2018.01)
*G06F 21/57*   (2013.01)

(52) U.S. Cl.
CPC .............. *G06F 8/65* (2013.01); *G06F 21/572* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,177,122 | B1 | 11/2015 | Trier |
| 9,996,142 | B2 | 6/2018 | Bulusu et al. |
| 10,177,934 | B1 | 1/2019 | Marr et al. |
| 10,860,307 | B2 * | 12/2020 | Suryanarayana ......... G06F 8/65 |
| 2011/0128158 | A1 | 6/2011 | Chou |
| 2016/0188313 | A1 | 6/2016 | Dubal et al. |

(Continued)

OTHER PUBLICATIONS

International Search Report and Written Opinion for PCT Patent Application No. PCT/US20/64682, dated Mar. 26, 2021, 10 pages.

(Continued)

*Primary Examiner* — Qamrun Nahar
(74) *Attorney, Agent, or Firm* — Compass IP Law PC

(57) ABSTRACT

Examples described herein relate to a network interface receiving a firmware update from one or more packets. In some examples, the one or more packets indicate a start of a firmware update. In some examples, the network interface can also perform authenticating the start of firmware update indication and based on authentication of the firmware update, permit a firmware update of a device. In some examples, the device is one or more of: Board Management Controller (BMC), central processing unit (CPU), network interface, Ethernet controller, storage controller, memory controller, display engine, graphics processing unit (GPU), accelerator device, or peripheral device. In some examples, an end of firmware update indicator is received in the one or more packets. In some examples, communications are maintained through a port during a firmware change.

19 Claims, 15 Drawing Sheets

(56) References Cited

U.S. PATENT DOCUMENTS

| | | | |
|---|---|---|---|
| 2017/0180137 A1* | 6/2017 | Spanier | G06F 8/65 |
| 2018/0217833 A1 | 8/2018 | Teisberg et al. | |
| 2019/0065172 A1 | 2/2019 | Nachimuthu et al. | |
| 2019/0079746 A1* | 3/2019 | Thomas | G06F 8/65 |
| 2019/0227783 A1* | 7/2019 | Chang | G06F 8/65 |
| 2021/0226846 A1* | 7/2021 | Ballard | G06F 8/65 |

OTHER PUBLICATIONS

"NVM Update Package", Oct. 16, 2019, 3 pages.

Coughlin, Fran, "Preparing for UEFI booting", BMC Support Central Documentation, https://docs.bmc.com/docs/display/bsadoc/Preparing+for+UEFI+booting, Jan. 14, 2016, 2 pages.

Intel, "Intel® 9 Series Chipset Family Platform Controller Hub (PCH) Datasheet", Jun. 2015, 815 pages.

Kim, Jin-Soo, et al., "Building a High Performance Communication Layer Over Virtual Interface Architecture on Linux Clusters", Computer System Research Department Electronics and Telecommunications Research Institute (ETRI) Daejeon 305-350, Korea, ACM 2001, 13 pages.

Microsoft, "How does the PXE boot process work?", https://techcommunity.microsoft.com/t5/itops-talk-blog/how-does-the-pxe-boot-process-work/ba-p/888557, Oct. 7, 2019, 5 pages.

Nuvoton, "Dual Bank Firmware Upgrade Mechanism", Application Note for 32-bit NuMicro® Family, Sep. 20, 2018, 30 pages.

Super®, "Embedded BMC/IPMI", User's Guide Revision 1.1, Copyright © 2010 by Super Micro Computer, Inc., Release Date: Jul. 2, 2010, 63 pages.

Intel Datasheet, "Intel 9 Series Chipset Family Platform Controller Hub (PCH)", Jun. 2015, 815 pages.

International Preliminary Report on Patentability for PCT Patent Application No. PCT/US20/64682, dated Mar. 26, 2021, 10 pages.

Nuvoton, AN0025, M2351, "Dual Bank Firmware Upgrade Mechanism", Rev 1.00, Sep. 20, 2018, 30 pages.

* cited by examiner

DEVICE FIRMWARE UPDATE TECHNIQUES

Computing devices can include firmware for hardware initialization, low-level hardware management, and managing device boot operation. In addition to the platform firmware, computing devices may also include dedicated firmware for controller chips, peripheral devices, or other components. Firmware can be read at runtime and during boot, but may be updated during a specialized firmware update process.

DETAILED DESCRIPTION

In data centers, Non-Volatile Memory (NVM) firmware updates on Network Interface Cards (NICs) can be performed on individual NICs, which can take a significant amount of time. For example, administrators can log-in locally to a computing system connected to a NIC to perform NVM (e.g., firmware) updates. Some solutions can remotely update a local area network (LAN) firmware on a system (e.g., LAN-on-motherboard) via a Board Management Controller (BMC) that are vendor-specific but do not allow firmware updates for vendor agnostic network interface devices or firmware updates over a network. Mass network interface downtimes are commonly used when handling firmware updates and such downtimes are costly as the devices are not utilized and customers may not receive service.

Various embodiments allow administrators of networks to update LAN controller firmware storage (e.g., non-volatile memory (NVM)) for any number of heterogeneous servers in a datacenter without local intervention (e.g., local log-in to the server). Various embodiments provide for updating the network interface cards (NICs) via packets and network services.

Figure 1:
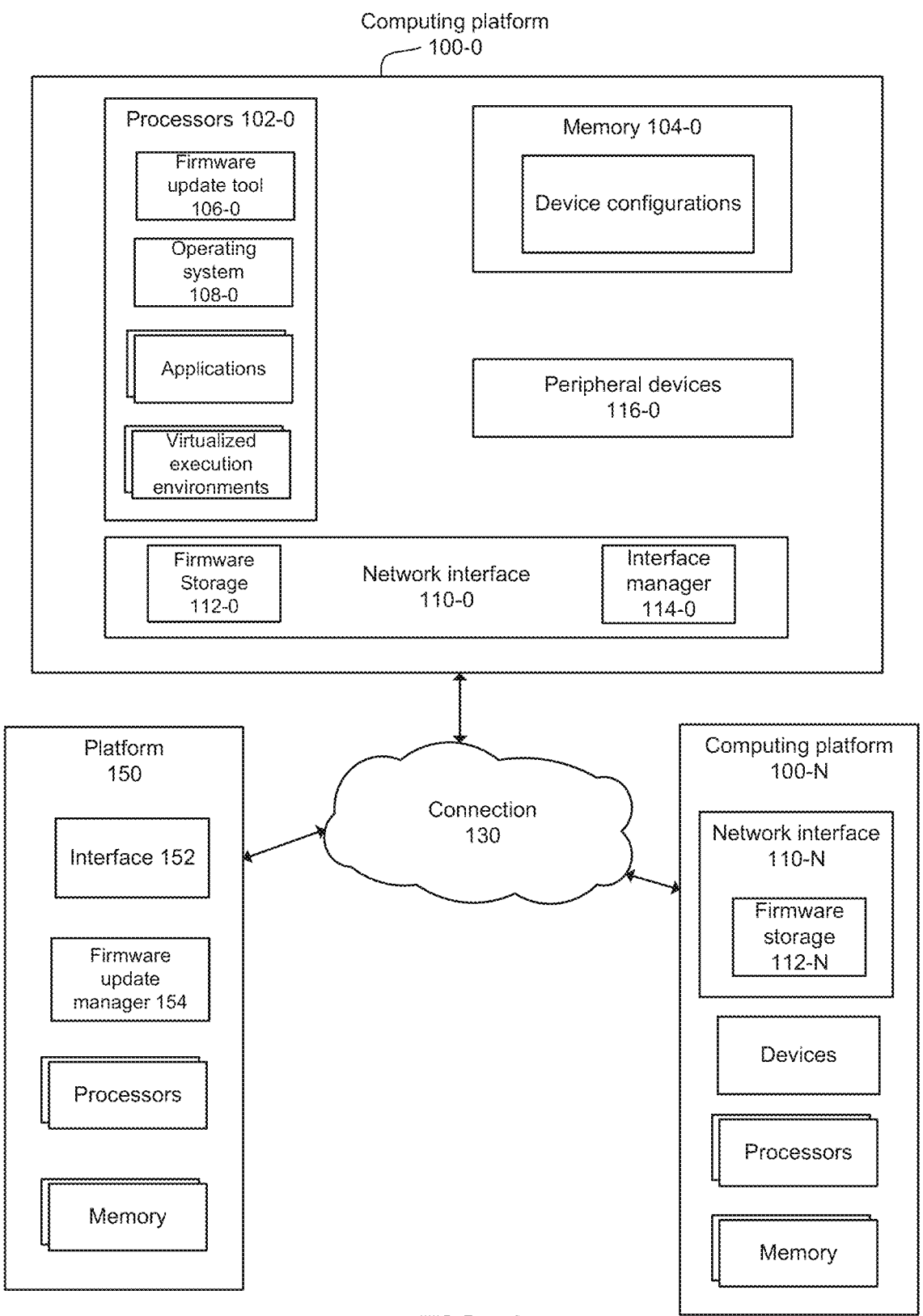
FIG. 1 depicts an example system.

FIG. 1 depicts an example system. The system can be used to update a firmware of one or more devices in accordance with embodiments described herein. Platform 150 can initiate or provide firmware updates to any of computing platforms 100-0 to 100-N (where N>1). Computing platform 100 can refer to any or all of computing platforms 100-0 to 100-N and any component of computing platform 100-0 can refer to a similar component in any or all of computing platforms 100-0 to 100-N. In some examples, processors 102-0 can include one or more of: a central processing unit (CPU), graphics processing unit (GPU), field programmable gate array (FPGA), or application specific integrated circuit (ASIC). In some examples, a CPU can be sold or designed by Intel®, ARM®, AMD®, Qualcomm®, IBM®, Texas Instruments®, among others. Processors 102-0 can execute OS 108-0. In some examples, OS 108-0 can be Linux®, Windows®, FreeBSD®, Android®, MacOS®, iOS®, or any other operating system. Memory 104-0 can be any type of volatile or non-volatile memory.

Computing platform 100 can use at least processors 102-0 and memory 104-0 to execute operating system 108-0, applications, or virtualized execution environments (VEEs). A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Platform 100-0 can support single-root I/O virtualization (SR-IOV). SR-IOV is a specification that describes use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCIe configuration space but can share one or more physical resources on the network adapter, such as an external network port, with the PF and other PFs or other VFs.

Platform 100-0 can use a network interface 110-0 to transmit or receive content using connection 130. Note that network interface 110 can refer to any of network interface 110-0 to 110-N. In some embodiments, an administrator can use firmware update manager 154 executed on platform 150 to select devices among computing platforms 100 to receive a firmware update and which firmware update to receive. In some examples, the administrator can access a graphical user interface to select one or more devices to receive a firmware update. Upon indication of successful firmware update, an administrator can deploy driver updates depending on the operating system.

In accordance with various embodiments, firmware update manager 154 (e.g., an orchestrator or other software and/or hardware) executing on platform 150 can issue a firmware or other software update to any computing platform 100 via network interface 108 to update at least firmware in network interface 108 without disrupting operation of network interface 108 and subject to authentication procedures described herein. Firmware or other software update of any device in any computing platform 100 can take place and a device can include one or more of: Board Management Controller (BMC), CPU, CPU socket, storage controller, memory controller, display engine, graphics processing unit (GPU), accelerator device, or any peripheral device 116-0. In some examples, network interface 108 can maintain at least manageability connections during firmware update. In some examples, during updating of firmware on network interface 108, network interface 108 can switch between use of a first channel or virtual interface that uses a current firmware to use of a second channel or virtual interface that uses a second firmware while maintaining connectivity to one or more devices. In some examples, at boot or in response to a firmware refresh trigger, any device in computing platform 100 (e.g., Board Management Controller (BMC), CPU, CPU socket, network interface 108, Ethernet controller, storage controller, memory controller, display engine, graphics processing unit (GPU), accelerator device, or any peripheral device 116-0) can request platform 150 to provide firmware for execution and, subject to authentication procedures described herein, can save the firmware into its firmware memory (e.g., volatile memory) and execute the firmware.

For example, firmware update manager 154 executed on platform 150 can initiate a firmware or other software update on network interface 108 (or other device) by sending a packet with a firmware update start indication to network interface 108. The firmware update start indication alert can be broadcast to all hosts on a particular virtual LAN (VLAN) in a broadcast domain for example or managed via an orchestration service. Firmware update tool 106-0 of computing platform 100-0 is alerted that an update is to occur. In some examples, after sending of the firmware update start indication, platform 150 can cause transmission of a firmware update executable binary file in one or more packets to the target computing platforms 100. In some examples, based on content of the firmware update start indication, computing platform 100 downloads and installs the firmware update image from a remote location using a secure connection to a secondary memory or flash memory location which is set to active. In various embodiments, a firmware update start indication, firmware update packets and/or the downloaded firmware update can be signed by platform 150 or a trusted source and validated by network interface 108 or computing platform 100 (e.g., firmware update tool 106-0).

Processors 102-0 can execute firmware update tool 106-0 to identify when an attempt to update firmware is initiated and to validate and permit or deny an attempt to update firmware of network interface 108 or another device. Firmware update tool 106-0 can determine if a firmware update is a newer version (e.g., higher build or version number) than a currently running firmware version and also determine if one or more security checks have passed. If both are true, firmware update tool 106-0 can copy a firmware update software (e.g., binary) to a memory from which a device can access the firmware and run the firmware update. In some examples, network interface 108 (or any device) can perform security and corruption checks before accepting firmware update. Firmware update tool 106-0 can initiate the firmware update (e.g., via an OS or a UEFI/BIOS option to transfer a binary). In some examples, the device will reboot or power cycle (e.g., power is reduced to zero for an amount of time before being raised to operating power level) to execute the firmware update.

After an attempted firmware update, firmware update tool 106-0 can indicate a status of whether a firmware update was successful. For example, firmware update tool 106-0 can write to a notification address (e.g., a TCP address or MAC address) to indicate success or failure and reason for failure (e.g., Package Security signature, Update Failed—Bad NVM signature, Update Ignored—Version not newer, or other).

In some examples, firmware can be instructions (e.g., binary code) that control device operation. For example, for a network interface firmware can add or update protocol support, update physical function (PF) lists, update netlists, update Ethernet message passing (EMP) firmware (e.g., exposes and interface for software to communicate with a link management agent), update link establishment state machine (LESM), assist link management agent obtain link, Netlist (e.g., customize the configuration of the network interface ports), configure admin queue, configure network interface defaults, configure remote direct memory access (RDMA) firmware, configure preboot binary executable, configure custom analog settings, configure physical layer (PHY) firmware, and so forth. In some embodiments, firmware can include one or more of: Basic Input/Output System (BIOS), Universal Extensible Firmware Interface (UEFI), a boot loader, Converged Security and Management Engine (CSME) firmware, platform security processor firmware, and BMC firmware among others. The BIOS firmware can be pre-installed on a personal computer's system board or accessible through an SPI interface from a boot storage (e.g., flash memory). In some examples, a BIOS can be stored on a device and accessible from the device by one or more cores or CPUs using an interface such as Serial Peripheral Interface (SPI) or other interface (e.g., PCIe). BIOS can initialize and test the system hardware components and loads a boot loader from a memory device which initializes and executes an operating system. Various non-limiting examples of firmware are provided herein. Note that reference to firmware can in some examples refer to any software update (e.g., driver, operating system, application, system software, and so forth).

Connection 130 can provide communications among any computing platform 100 as well as between any computing platform 100 and platform 150. Connection 130 can provide communications compatible or compliant with one or more of: Ethernet (IEEE 802.3), remote direct memory access (RDMA), InfiniB and, FibreChannel, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, fabric interface, and variations thereof. Data can be copied or stored to virtualized storage nodes using a protocol such as NVMe over Fabrics (NVMe-oF) or NVMe.

Figure 2:
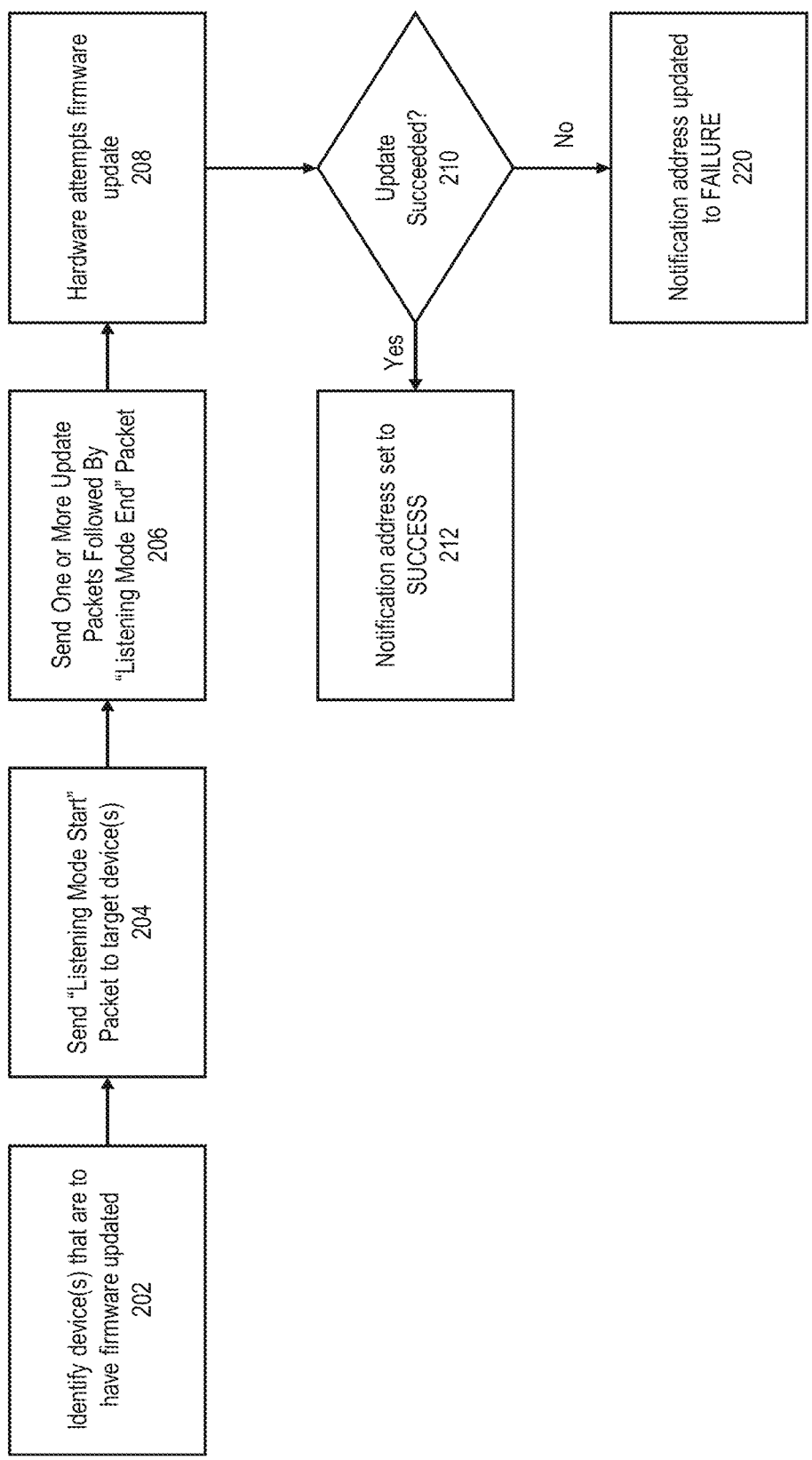
FIG. 2 depicts an example process that can be performed to configure a device for a firmware update using received packets.

FIG. 2 depicts an example process that can be performed to configure a device for a firmware update using packets transmitted through a network or fabric. For example, a packet can include formatted collections of bits that may be sent across a network, such as Ethernet frames, IP packets, TCP segments, UDP datagrams, or other standardized or proprietary formats. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. In some examples, the process can be performed by computing platform with a network or fabric interface.

At 202, one or more devices that are to receive an update of firmware can be selected. For example, a network administrator can configure one or more hardware devices to support receipt of firmware update through packets. For example, the network administrator can configure use a graphical user interface or a script to select the devices that are to receive a firmware update. The administrator can configure the selected devices to respond to certain packets that indicate a firmware update is to follow, a firmware update is provided, or terminate firmware update. The administrator can use data center management or orchestration software to identify one or more devices to update and send out "update" or "listening mode start" packets to one or more targeted devices. In some examples, the data center management or orchestration software is trusted by receiving devices to perform firmware updates. For example, one or more devices that can have firmware updated by transmission using packets can include Board Management Controller (BMC), CPU, CPU socket, network interface, Ethernet controller, storage controller, memory controller, display engine, graphics processing unit (GPU), accelerator device, any peripheral device, and so forth.

At 204, a listening mode start packet can be sent to the selected one or more devices. An administrator can use software to send a listening mode start packet before causing a firmware update to be sent to the selected one or more devices. The listening mode start packet can be used to indicate a firmware update is to be transmitted after the listening mode start packet. For example, a listening mode start packet can be broadcast or sent sequentially to the selected one or more devices. A listening mode start packet can include a payload that indicates a signature that the receiver can read to identify a firmware update is to follow in one or more other packets. In some examples, a header field (e.g., a particular EtherType) of the listening mode start packet can indicate a packet is a listening mode start packet. In some examples, header fields of the listening mode start packet (e.g., source IP address) can identify a sender of the listening mode start packet as a trusted source. A host system can process the listening mode start packet to determine that a firmware update will follow in subsequent packets. In some examples, a listening mode start packet can include a payload that also includes a portion of a firmware update.

At 206, one or more firmware update packets are transmitted to a network interface that is to receive packets for the selected one or more device that are to receive a firmware update. The network interface can receive the update packets through one or more ports. In some examples, a header field of the update packet (e.g., EtherType) can identify the packet as a packet that transmits a firmware update. A payload of an update packet can include one or more of: firmware update, metadata that includes an address of a location from which to download the firmware update, or notification address for notification of firmware update status. For example, the one or more firmware update packets can include a firmware binary file. The one or more firmware update packets can be transmitted by a firmware repository device through a connection to the network interface. The same or different platform that sends a listening mode start packet can also send the one or more firmware update packets.

In some examples, after a firmware update is provided in one or more firmware update packets, at 206, a listening mode end packet can be sent to the platforms for which device firmware updates were attempted in order to inform the platforms that the firmware update has completed. The same or different platform that sends the one or more firmware update packets can also send the listening mode end packet.

At 208, a selected hardware device attempts a firmware update using the received content in the one or more packets. For example, the host system can execute a firmware update tool such as Intel® NVM Update Tool version 7.1 (or any earlier or later version) to manage a firmware update of one or more devices connected to the host system. For example, a host computing system can authenticate the received content by performing a security hash on content of the received packet to determine if the calculated value matches an expected value. The host system can determine if a firmware version is newer than a currently running firmware version. If the firmware update version is newer and the security check has passed, the host can validate that the firmware update is allowed. The device can download the firmware update to a memory. In some examples, the device can perform its own validation that the firmware update is accepted such as an additional security check (e.g., firmware has an invalid security signature or is not the correct firmware for the device). The device can indicate to the host computing system that the firmware update was successfully received at the memory and successfully or unsuccessfully applied.

After a listening mode end packet is received and the firmware is validated, the device that receives a firmware update can be subject to a power cycle (e.g., reduction or loss of power to the device followed by restored power) to cause the firmware update to be executed by the device.

At 210, after the attempted firmware update, the host can determine whether the firmware update was successful or unsuccessful. To indicate whether the update was successful or unsuccessful, the host can write to a notification address. A notification address (e.g., TCP address or MAC address) can be provided with the listening mode start packet. For a successful firmware update, 212 can follow, where an indication of success is written to the notification address. For an unsuccessful firmware update, 220 can follow, where a return code to the notification address of unsuccessful firmware update can include: update failed—Bad Update Package Security signature, Update Failed—Bad Firmware signature (e.g., firmware has a valid security signature and is valid firmware but is not the correct firmware for the device), Update Ignored—version not newer, and so forth.
Channel Switch-Over for Firmware Update Firmware updates for devices such as a network interface can include updates for Ethernet firmware, physical layer interface (PHY) firmware, and manageability updates such as updates to a BMC. Firmware updates applied to a network interface can cause the network interface to be disabled during the firmware update and some solutions drop link on a manageability port during a firmware update. Manageability network ports provide heartbeat packets, probe messages, telemetry collection, and various keep alive transmit/receive packets, including Address Resolution Protocol (ARP) messages, acknowledgements (ACKs), neighbor solicitation and other discovery protocols. Manageability packets allow network clusters to stay online at least for High Availability (HA), fault tolerance, and manageability. The loss of link could cause telemetry traffic to be lost, Virtual Functions (VFs) to be dropped, connections being lost, and so forth, which can lead to violation of service level agreements (SLAs) or increased total cost of ownership (TCO) as equipment is not available for use.

Various embodiments can maintain network connectivity on manageability enabled ports of a network interface during a firmware update. Various embodiments can occur on boot or during runtime without dropping transmit or received packets or resetting a network interface. Various embodiments allow remote administrators to maintain connection to the system they are updating for an unknown amount of time as the manageability services are maintained during firmware update. Accordingly, manageability services can continue during a firmware update to maintain network services that depend on an active link with another device. Various embodiments provide an interface or channel for at least two versions of firmware stored in firmware memory. For example, for a current firmware version, a first interface or channel can execute the current firmware version. If a firmware update is received in the firmware update, another interface or channel with a same MAC address as that of the first interface or channel can execute the firmware update and maintain a link (e.g., manageability service). Various embodiments can cache or store received or transmitted packets during a down link and allow storage and processing of received packets or transmission of packets at a later time after link is restored.

Figure 3A:
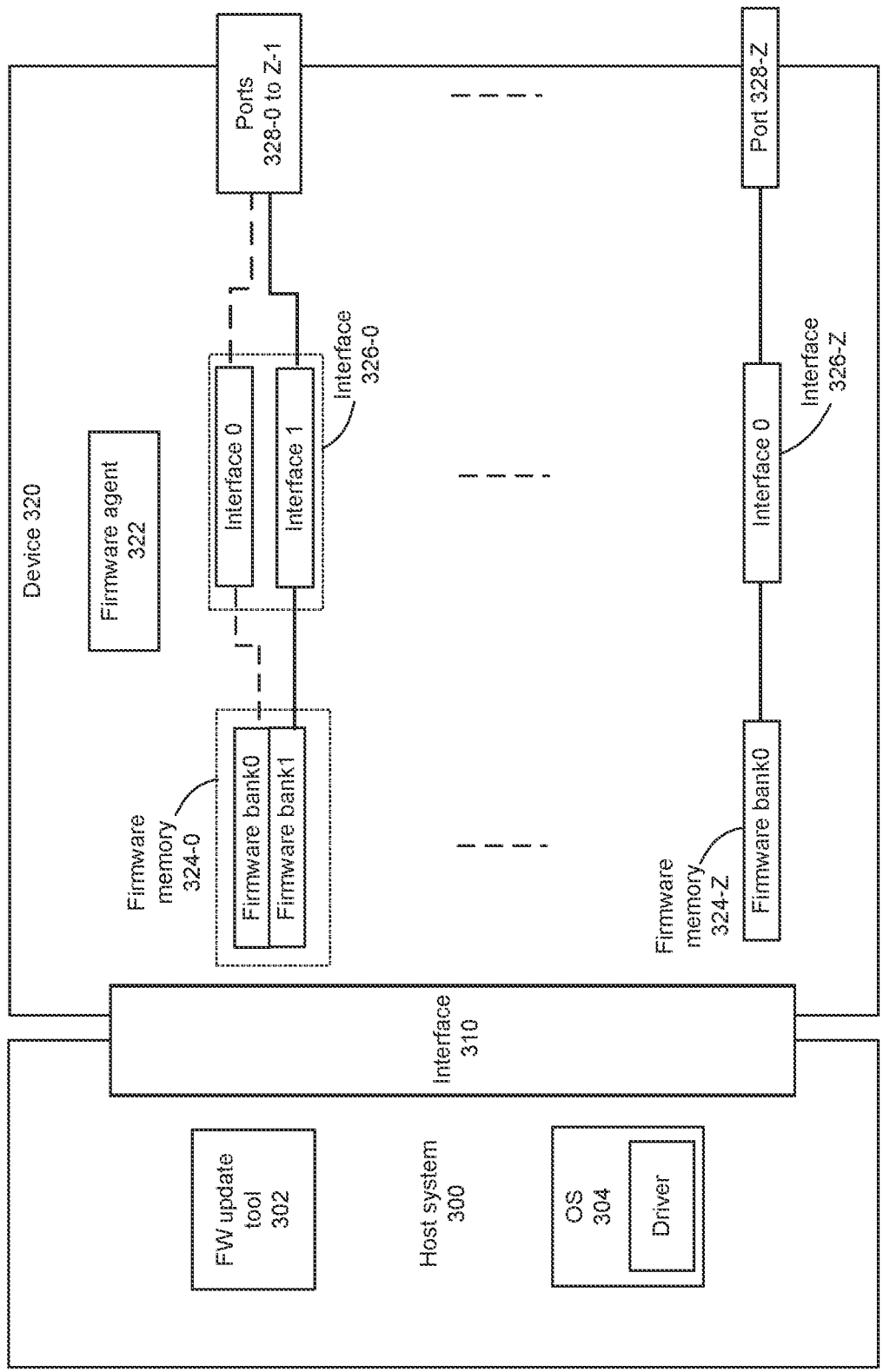
FIGS. 3A and 3B depict example systems.
Figure 3B:
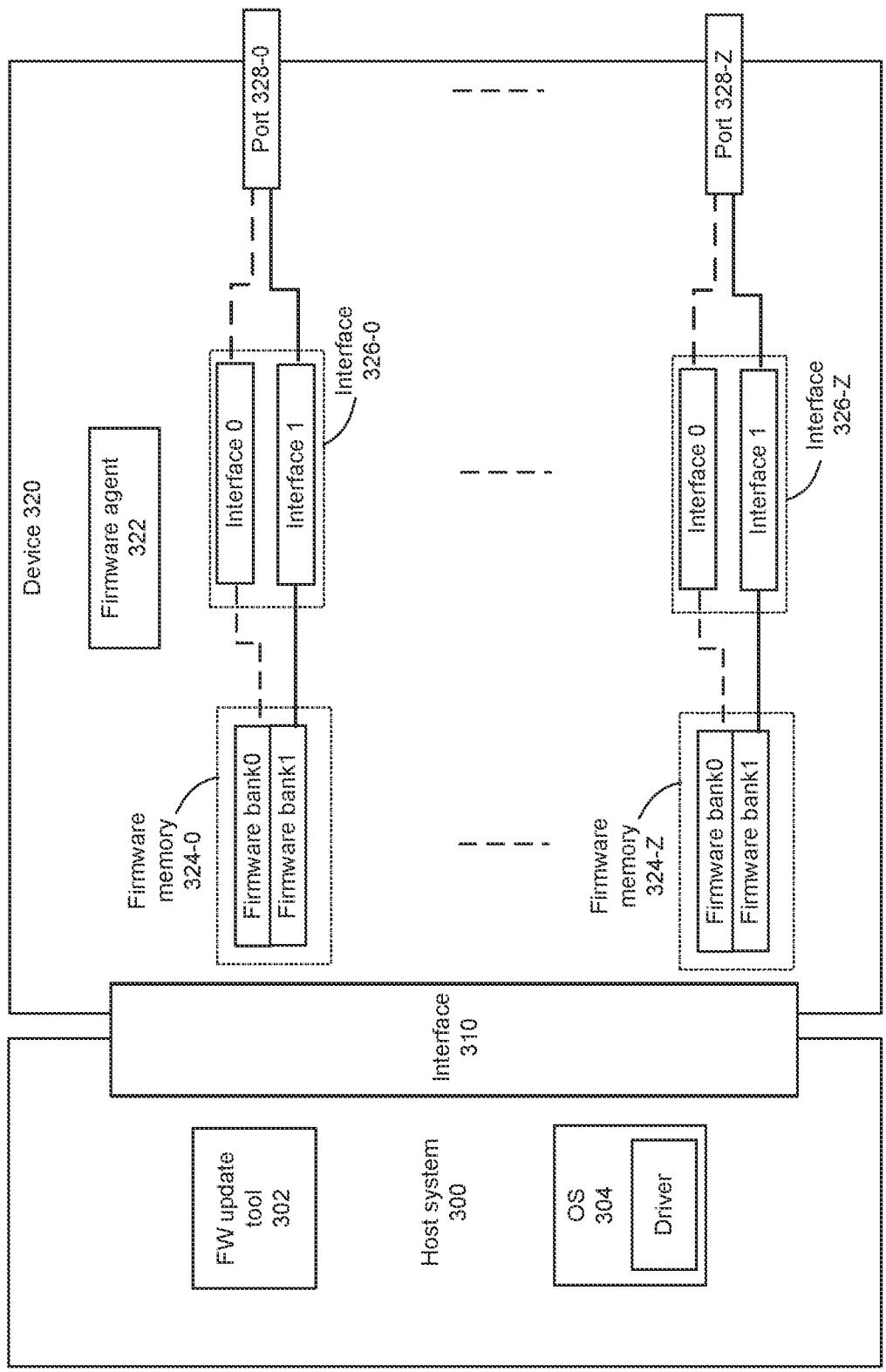

FIGS. 3A and 3B depict example systems. In the examples of FIGS. 3A and 3B, host system 300 can include a computing platform with processors, memory and other components. All components of host system 300 are not illustrated for the sake of clarity. As is described in more detail later, firmware (FW) update tool 302 can select which firmware is to be used by a port interface. However, in some examples, where a firmware update changes a number of configured physical functions (PFs) or port speed, host 300 may be reset and can disrupt operation of host system 300 or device 320 if host 300 is rebooted. OS 304 can provide interaction between host system 300 and device 320 using a driver. In the examples of FIGS. 3A and 3B, host system 300 may merely indicate which firmware bank to use and FW agent 322 can decide which interface to use without control or management of host 300. In other words, changes to which interface is used can occur independent of control of host system 300 and host system 300 does not receive or store any configuration information that device 320 includes multiple interfaces.

Interface 310 can provide connectivity between host system 300 and device 320. For example, device 320 can be a peripheral device to host system 300 and connected through interface 310. Interface 310 can include signal conductors and accessed using a protocol. For example, interface 310 can include a bus, interconnect, mesh, pins, or other conductive circuitry or signal (e.g., electrical or optical) conducting materials. Interface 310 can provide communications with any public standard or proprietary specification. For example, interface 310 can provide communications in compliance with peripheral component interconnect express (PCIe), NVLink, Compute Express Link (CXL), and other standards or specifications.

In the example of FIG. 3A, device 320 can include multiple firmware memory banks to facilitate firmware rollback in the case that undesired behavior is experienced after a firmware update. For example, firmware memory 324-0 can store firmware versions in firmware bank0 and firmware bank1 that are available for execution by respective interfaces 0 and 1 of interface 326-0. In some examples, interfaces 0 or 1 of interface 326-0 are coupled to transmit or receive packets using one or more of ports 328-0 to 328-Z. Firmware memory 324-0 can include multiple firmware banks (e.g., firmware banks 0 and 1). Firmware banks can operate independently in order to permit reload without interrupting the active interface used by a physical port.

In some examples, interface 0 executes firmware from firmware bank0 and firmware bank 1 can be updated to store a firmware update. Initially interface 0 loads firmware from firmware bank0 and after a firmware update to firmware bank1, interface 1 can load and run firmware from firmware bank1. Firmware agent 322 can select interface 1 of interface 326-0 to execute firmware from firmware bank1 of firmware memory 324-0 so that for ports 328-0 to 328-Z-1, device 320 can use interface 1 running firmware in firmware bank1 to maintain connectivity using ports 328-0 to 328-Z-1 with a device (e.g., a link partner).

Note that in some examples, interface 0 can execute firmware from firmware bank 1 and interface 1 can execute firmware from firmware bank 0.

Firmware agent 322 can be implemented as silicon device, programmable processor or device, that controls which firmware an interface is to use from firmware memory and controls which interface is operational or active for a port. Firmware agent 322 can be programmed or controlled to select a firmware memory bank for use by firmware update tool 302 of host system 300. Selection of interfaces could be performed by use of a bit set by host system 300 to indicate which firmware bank is active, although this example of selection is non-limiting and other manners of specifying which firmware memory bank can be used.

In this example, firmware memory 324-Z can include a single firmware version and interface 326-Z include a single interface and the interface is coupled to port 328-Z. In other examples, more than two interfaces or more than two firmware banks can be used for one or more ports. In some examples, there is a one-to-one correspondence between interface and a firmware bank such that an interface runs firmware from its corresponding firmware bank and selecting a firmware bank for use can cause its corresponding interface to be used.

For example, interfaces 0 and 1 can be replica circuitry that are capable of running the same or different firmware to perform operations specified by the firmware. Interfaces 0 and 1 can perform operations defined for an Ethernet network interface in IEEE 802.3-2018 such as one or more of: physical (PHY) layer operations, media-independent interface (MII) connectivity, media access control (MAC) layer, Physical Media Dependent (PMD) operations, forward error correction (FEC), physical coding sublayer (PCS) operations, and so forth. Interfaces 0 and 1 can perform operations defined by other specifications such as but not limited to RDMA, InfiniB and and other protocol specifications.

In some examples, port 328-0 is a manageability network port that is used to provide heartbeat packets, probe messages, telemetry collection, and various keep alive transmit/receive packets, including Address Resolution Protocol (ARP) messages, acknowledgements (ACKs), neighbor solicitation and other discovery protocols. Maintaining operation of port 328-0 during firmware update can prevent disruption of manageability operations.

FIG. 3B depicts an example system in which device 320 includes multiple interfaces for a port. For example, as in the example of FIG. 3A, firmware memory 324-0 can include firmware banks 0 and 1 that are accessible by interfaces 0 and 1, however, one or multiple interfaces can be available per port. For example, port 328-0 can be coupled to interface 0 or 1 of interface 326-0 and port 328-Z can be coupled to interface 0 or 1 of interface 326-Z. Note that in some examples, interface 0 can execute firmware from firmware bank 1 and interface 1 can execute firmware from firmware bank 0.

Figure 4A:
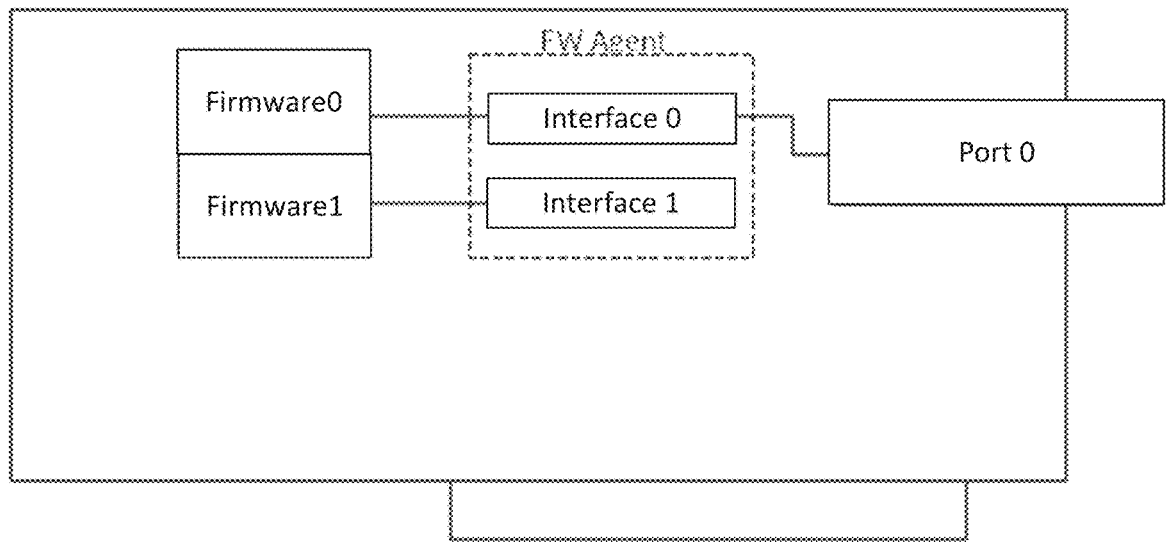
FIGS. 4A and 4B depict an example of transition to use of another interface.
Figure 4B:
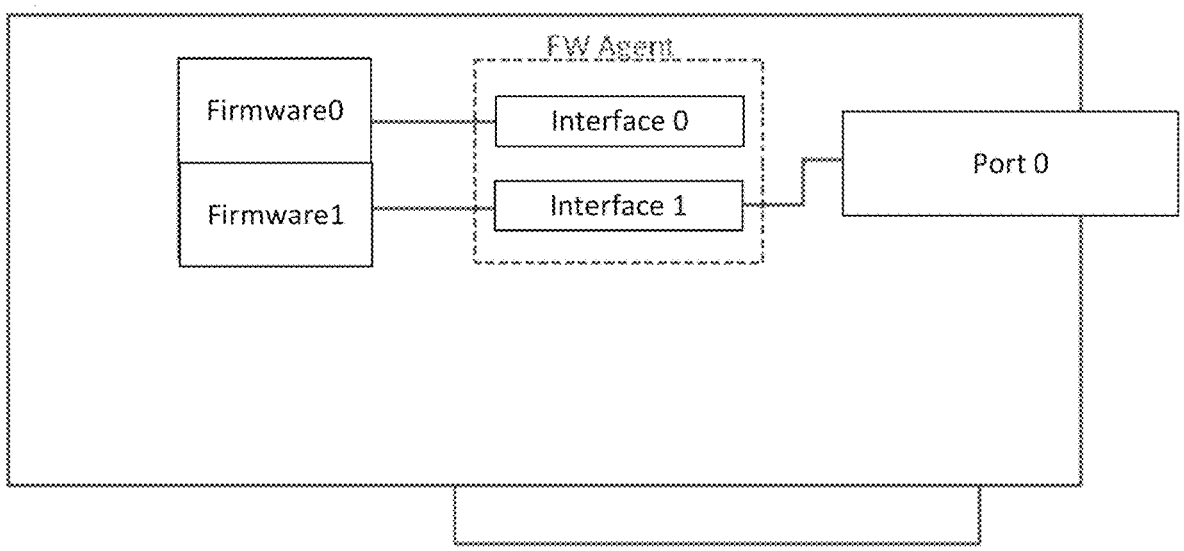

FIGS. 4A and 4B depict an example of transition from use of interface 0 for port 0 to use of interface 1 for port 1. In FIG. 4A, interface 0 executes firmware from firmware bank0 (firmware0) for communications using port 0. For a firmware update, firmware is available in firmware bank 1 (firmware1) and interface 1 can execute the firmware from firmware1. As shown in FIG. 4B, FW agent selects interface 1 for use for connectivity between port 0 and a host system.

Figure 5:
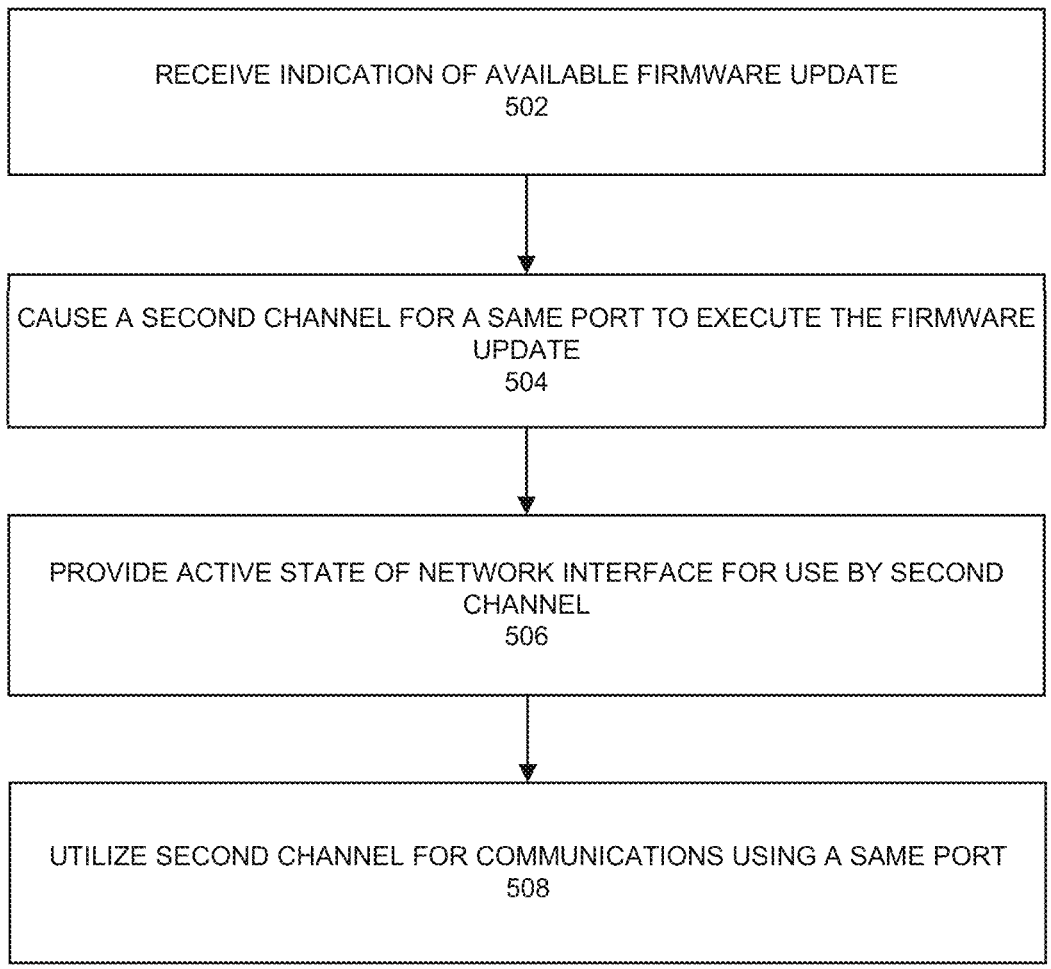
FIG. 5 depicts an example process.

FIG. 5 depicts an example process. The process can be performed by a network interface to maintain network connectivity on manageability enabled port(s) of a network interface during a firmware update or other ports. The process can be applied where a power reset or power cycle of network interface is not needed. Note that in a case where a power reset or power cycle of network interface is to occur to prior to use of the updated firmware, a power reset can be applied and a firmware update occurs after the power reset.

At 502, a network interface can receive an indication that a firmware update is available for use. For example, a firmware update tool executed on a host device connected through an interface to the network interface can indicate to a firmware agent or other device or processor used by the network interface that a firmware update or other firmware version is available for use. Firmware can be stored in a memory device such as a volatile or non-volatile memory device and received in accordance with various embodiments described herein or in accordance with any manner. In some examples, multiple regions in a memory device available to a network interface are available to store multiple of the same or different versions of firmware such that a first region can store a first version of a firmware and a second region can store a second or same version of firmware. The second memory region can be considered a second bank and the second bank can be used for a rollback to store a prior version of the firmware in case the network interface is to rollback to using an earlier version of the firmware such as if the updated version of the firmware causes a device malfunction or other reason. A channel or interface within the network interface can expose the first version of the firmware from the first region while a firmware update is written to the second region. A channel or interface within the firmware agent or other device or processor of the network interface can be circuitry that can be configured for operation using the firmware. For example, a channel or interface can perform physical interface operations in accordance with application specifications of the network interface such as Ethernet, RDMA InfiniB and other protocol specifications.

At 504, the network interface can cause a second channel or interface to load and execute the firmware update from the second region. For example, the firmware agent or other device or processor of the network interface can cause a second channel or second interface of the network interface to operate using the updated firmware from the second memory region. For example, the second channel or interface can be capable of process packets transmitted or received using the same physical or virtual port as that of channel or interface that operates using the first version of the firmware. The firmware agent or other device or processor can switch to use of the firmware update by causing the second channel or interface to load and operate using the updated firmware.

At 506, an active state of the network interface can be copied to the second memory region for use by the second channel or interface. For example, an active state can include configuration space information such as PCIe configuration information, physical function driver resources (e.g., queues, etc.) or external Ethernet port configurations.

At 508, the second channel or interface can be used to process packets while maintaining transmission or receipt of packets from a same port. After the second channel or interface has loaded the firmware update and mimics an active state of the channel or interface, a firmware agent can route packets to and from the port through the second channel or interface without dropping link. An NVM Update (NUT) can be used to manage the firmware update and determine and report if the update has occurred successfully.

Remote Firmware Update

In datacenters, the platform configuration can be set at initial provisioning and stored locally on a serial peripheral interconnect (SPI) accessible flash memory device. The local flash memory can be used to store basic platform firmware (e.g., BIOS, UEFI, CSME, BMC, etc.) and respective configurations. Fixed firmware configurations can complicate platform management. In some cases, the data center administrator manages each platform separately through existing management interfaces such as Intelligent Platform Management Interface (IPMI) or Redfish® but settings may not be available to edit without going through a reset cycle (e.g., BIOS configuration). In some cases, the platform configuration update involves an update being committed to SPI flash memory which is prone to errors and can lead to corruption of the firmware and/or configuration. Additionally, low level firmware and configuration is becoming the target of malicious hacker attacks which in extreme cases can lead to permanent rootkit insertion or permanent denial of service (PDoS).

BMC controllers can be used to update firmware but may not allow returning platform firmware to an original state, which leaves an opening for malicious code (and potential rootkits) to remain in platform flash across the platform lifecycle. In some server platforms, flash management can use Enhanced Serial Peripheral Interface (eSPI). However, the persistent nature of SPI or eSPI flash memory can leave an opening for, throughout supply chain and platform transit, for malicious code insertion and poses a risk that malicious code will permanently reside in the platform flash.

For single and multi-server platform firmware updates, various embodiments provide seamless update of firmware or device firmware independent of the platform power state (e.g., potentially avoiding platform resets after firmware updates) and potentially reduce of CPU cycles while the host is running an operating system (e.g., system management interrupts) to oversee firmware updates. Various embodiments manage platform and device firmware updates and configuration over a mutually authenticated and secure channel with a firmware repository. A platform can store platform firmware in volatile memory, or any type of memory (e.g., persistent flash storage). A remote firmware repository can be managed by a Platform Firmware Configuration Service (PFCS) that can facilitate sending, serving or streaming firmware to one or a large number of servers within a data center simultaneously. The PFCS can manage firmware updates, rollback policies, while ensuring firmware component dependencies are met. A platform level mechanism can issue firmware update notifications, including a manifest that describes the changes. Firmware activation policies can be self-managed by the firmware consumers (e.g., devices or platforms).

Various embodiments reduce the risk of malware attack on platform firmware which could persist over power cycles as neither firmware nor the configuration is stored in a persistent state on the platform or a device. Various embodiments provide secure initial provisioning and protection against supply chain attacks on firmware configuration, since platform has no embedded persistent or non-volatile firmware storage and can be supplied with latest, trusted firmware from an authenticated repository/service in the management network. Various embodiments provide a seamless way for firmware updates as a platform caches and authenticates the latest, verified firmware and can immediately revert to a last known good (LKG) configuration. Various embodiments provide a data center management process, as firmware configuration can be automatically tuned for the platform by a remote firmware configuration repository when the platform authenticates itself to the repository server. Various embodiments provide configuration changes independent of the host state and can be performed remotely in any system power states.

Various embodiments provide a single point of access for a firmware repository to potentially avoid SPI access synchronization issues during firmware updates whereby multiple devices attempt to access firmware updates using a SPI interface. Various embodiments can improve overall firmware security as a single or distributed system can be responsible for authentication of all downloaded or cached firmware and protects the cached firmware image against malicious tampering.

Various embodiments allow exposing a virtual flash memory to allow a device to perform additional telemetry on the traffic issued by host system and management controller.

Various embodiments potentially eliminate black-out periods for firmware updates as configuration is managed by a remote agent. For example, UEFI NV GET/SET operations could be forwarded and processed by the Platform Firmware Configuration Service, which could be available at all times.

Figure 6:
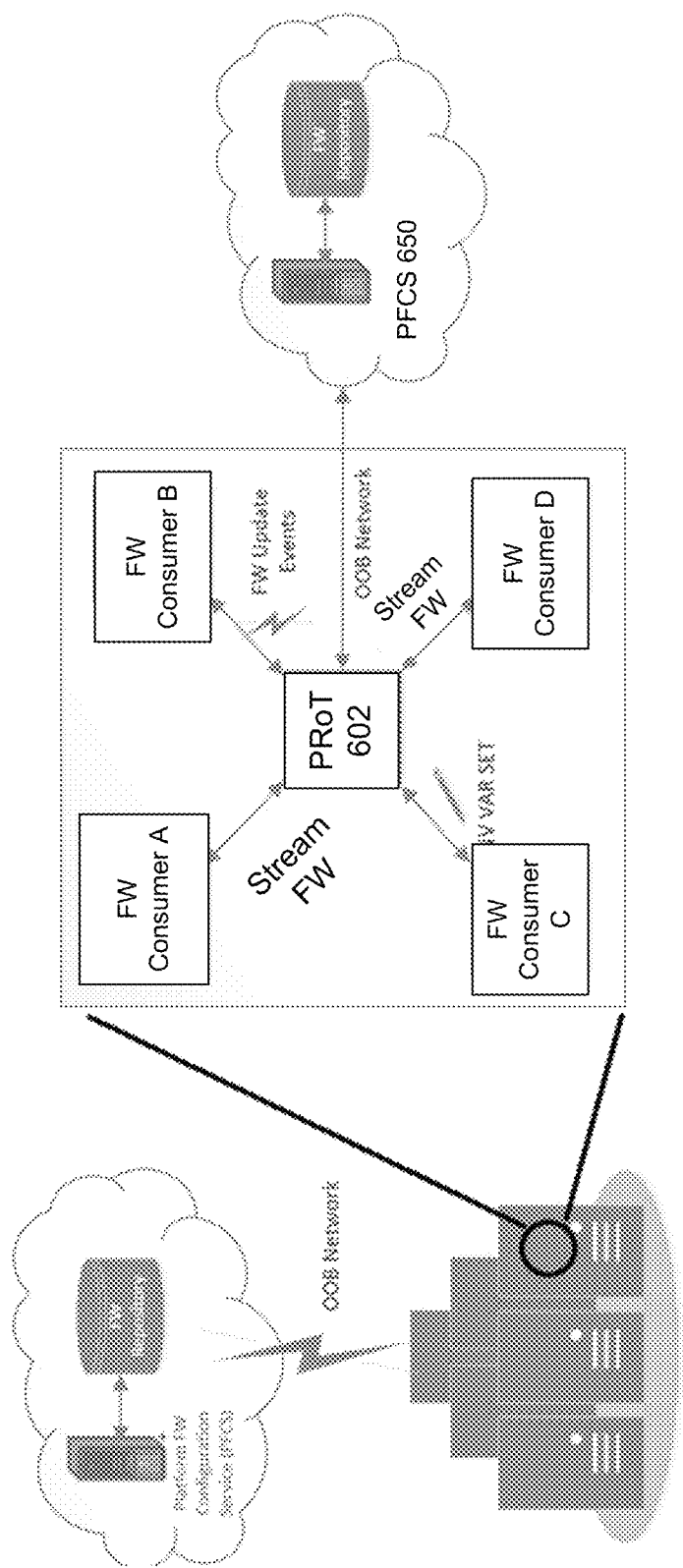
FIG. 6 depicts an example system.

FIG. 6 depicts an example system. Various embodiments use a Platform Root of Trust (PRoT) 602 and a Platform Firmware Configuration Service (PFCS) 650. PRoT 602 of the server platform can leverage on-chip memory for its own secure boot and use an initial bootstrap firmware image for the Board Management Controller (BMC) to provide PRoT 602 with a network interface to a datacenter management network. Using a network or fabric, PRoT 602 can obtain a firmware from PFCS 650. In some cases, attacks to a read only memory (ROM) or other memory device storing firmware made during transport between manufacturer and customer can be avoided by updating firmware on boot or other causes or triggers (e.g., timer expiration). For example, a reduced likelihood of permanent denial-of-service (PDOS) from tampering with firmware can be achieved by use of PRoT 602 to request device firmware from PFCS 650.

PRoT 602 can include a cryptographic identity (e.g., unique X.509 certificate chain, endorsed by platform owner or administrator) and a manifest of platform configuration. During platform bring-up, PRoT 602 can communicate the cryptographic identity to PFCS 650 in order to authenticate the platform (and itself) to PFCS 650 while also authenticating PFCS 650 (using provisioned PFCS credentials) and establish a protected session. A confidentiality of the session may be used if any secrets are to be transmitted during the session.

As PRoT 602 authenticates the platform to PFCS 650, PRoT 602 can present a manifest of platform configuration which allows PFCS 650 to assemble a tailored firmware package through use of firmware templates managed by PFCS 650. A firmware template could define components such as an executable binary, configuration parameters, upgrade/downgrade policies (e.g., including system or device reset requirements), external component dependencies, and security or execution flow policies (e.g., keep out regions based on reset/power flows). As or after PRoT 602 establishes a secure session with PFCS 650, PRoT 602 can receive the pre-assembled firmware package which will be used through the remaining steps of platform bring-up. The firmware package can include components such as runtime BMC firmware, Server Platform Services (SPS) firmware, management engine (ME) firmware, BIOS firmware images, UEFI, or bootloader, as well as firmware configuration for various platform components including power supply units (PSU), voltage regulators (e.g., DigVR) and programmable backplane (e.g., Hot-Swap Backplane firmware (HSBP)). If PRoT 602 performs an out-of-band discovery of add-on cards on the platform, PRoT 602 can request any update packages that may be relevant for those in the PFCS 650 repository.

At runtime, PRoT 602 can maintain cached firmware code and configuration in a protected memory region and perform active filtering to enforce firmware execution flow policies and protect against potentially malicious commands such as erase/write to active/static regions of firmware. PFCS 650 may initiate integrity and configuration checks on any cached code and configuration. PFCS 650 may also invalidate and force a recovery procedure to load a firmware eat any time if triggered by a platform administrator. It should also be noted, that at any point, PRoT 602 may initiate integrity and configuration checks with PFCS 650 to retrieve the latest firmware. For example, triggers for firmware retrieval could be at power state transitions, e.g. warm resets, suspicious activities found during active filtering, or timer expiration.

PFCS 650 can store and maintain firmware and configuration templates used to prepare platform specific images. Datacenter management can create policies and groups of configuration and apply them selectively to the platforms depending on the policy and the result of platform authentication to PFCS 650, therefore simplifying and automating the configuration process. The datacenter management can also prepare a specific configuration for particular platform, e.g., in order to perform special tasks like debug, and so forth.

In some examples, the PRoT 602 can be used in any device such as a network interface, switch, or CPU. For example, a network interface, BMC or other device can use PRoT 602 to retrieve firmware from PFCS 650 independent from its host system. At start-up or restart, network interface can use firmware code stored in a ROM to communicate with PRoT 602 and retrieve firmware to run from volatile memory in a manner as described herein. The network interface can next retrieve firmware for the BMC, then the manageability engine (ME) and other devices in the host system. The network interface or BMC can appear to another device as a virtual Serial Peripheral Interface (SPI) firmware device from which to retrieve firmware for various devices and the devices can retrieve the firmware from the network interface's or BMC's memory.

Figure 7A:
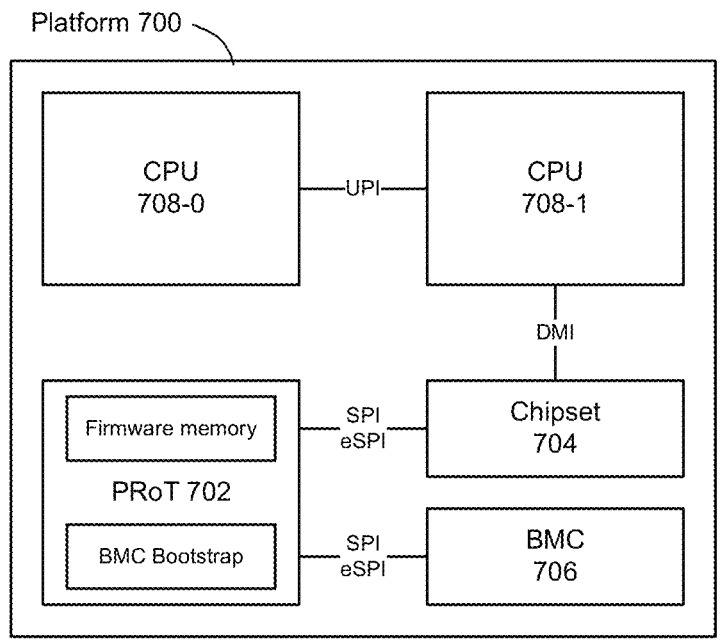
FIGS. 7A-7D depict an example of system states and interaction during a firmware update.

FIGS. 7A-7D depict an example of system states and interaction during a firmware update. In the scenario of FIG. 7A, at platform power-on, potentially only the Platform Root-of-Trust (PRoT) 702 powers up with internal configuration. PRoT 702 can apply a baseboard management controller (BMC) bootstrap image for BMC 706. Chipset 704 can control data paths and support functions used in conjunction with any of CPUs 708-0 and 708-1 such as access to system clock, Flexible Display Interface (FDI) and Direct Media Interface (DMI). In some examples, FDI is used when chipset 704 supports a processor with integrated graphics. As such, I/O functions can be assigned between chipset 704 and any of CPUs 708-0 and 708-1. Chipset 704 can include a Platform Controller Hub (PCH). Chipset 704 can include memory controller, PCIe lanes or other input/output controller, and Intel Management Engine (ME) or other remote control device.

Figure 7B:
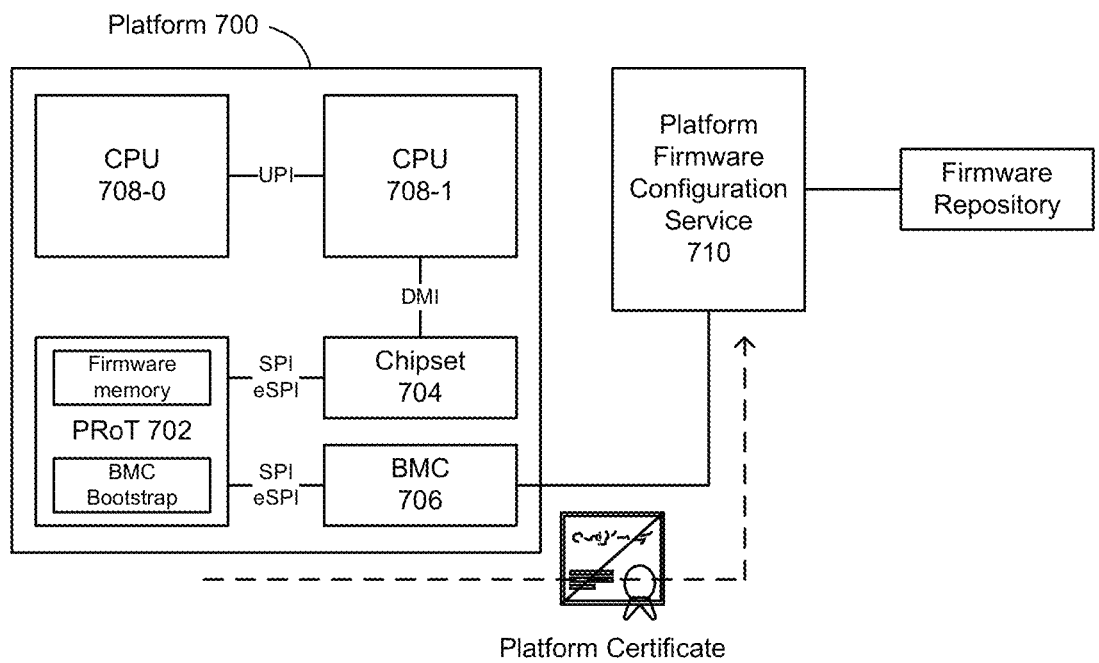

In the scenario of FIG. 7B, PRoT 702 powers up BMC 706 and serving BMC 706 an initial bootstrap image. The initial bootstrap image can provide PRoT 702 with network connectivity to a management network to communicate with Platform Firmware Configuration Service 710. PRoT 702 can transfer a Platform Certificate to Platform Firmware Configuration Service 710. For example, BMC 706 can be a device that measures system or device temperatures, power-supply voltage, system humidity, fan speeds, operating system (OS) functions, or communications parameters. In some example, BMC 706 can be trusted to retrieve firmware for other devices including PRoT 702 or CPU 708-0 to 708-1.

Figure 7C:
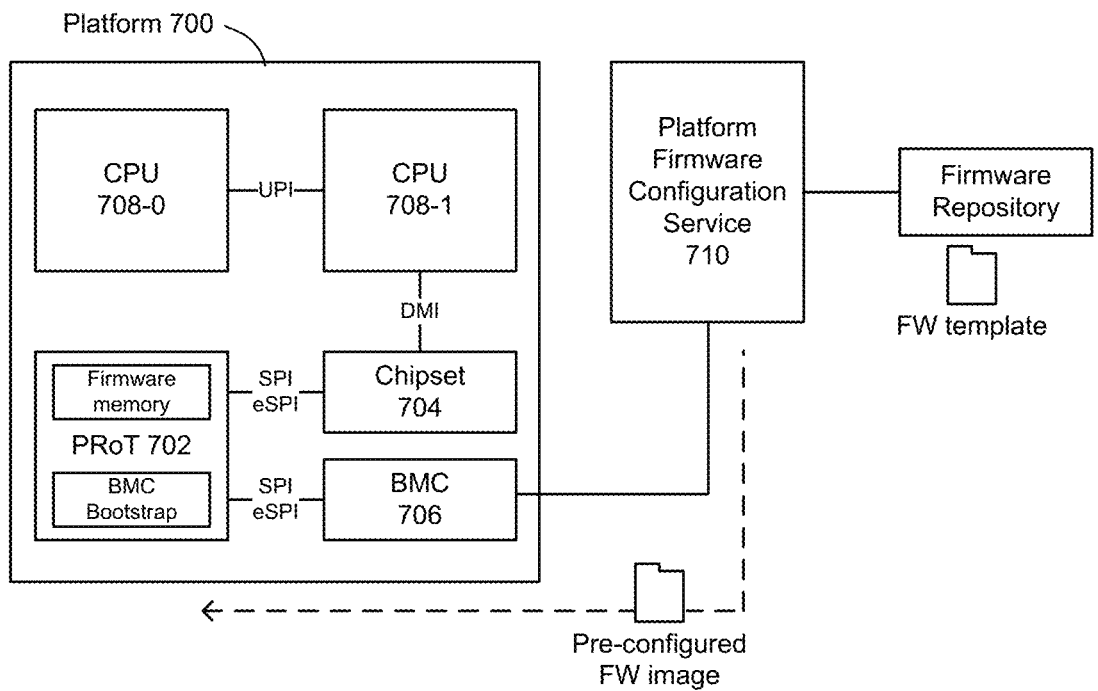

In the scenario of FIG. 7C, Platform Firmware Configuration Service 710 attempts to authenticate PRoT 702 based on the received certificate. If the certificate or a calculation (e.g., hash) based on the certificate matches an expected certificate or value, Platform Firmware Configuration Service 710 assembles a complete firmware (FW) image for one or more of: BMC, CPU, CPU socket (e.g., CSME, Authenticated Code Modules (ACMs), etc.) and any other programmable devices with pre-configured settings. A firmware image can include components such as runtime BMC firmware, SPS/ME and BIOS firmware images as well as firmware/configuration for various platform components including power supply units (PSU), voltage regulators (DigVR) and programmable backplane (HSBP). Platform Firmware Configuration Service 710 can use a pre-stored firmware template to create a firmware image (IFWI) based on hardware configuration of platform 700. A firmware template could define components such as executable binary, configuration parameters, upgrade/downgrade policies (including reset requirements), external ingredient dependencies, and security/execution flow policies (e.g., keep out regions based on reset/power flows). Platform Firmware Configuration Service 710 can transmit the firmware image to platform 700. PRoT 702 can authenticate the firmware image using unique hardware IDs, computed hashes or other security authentication approaches. If the firmware image is authenticated or verified, PRoT 702 loads the firmware image into firmware memory (e.g., encrypted volatile memory). PRoT 702 can reconfigure BMC 706 using the authenticated firmware image and allow CPU 708-0 or 708-1 to power-up and boot using firmware. For example, the firmware can be received from Platform Firmware Configuration Service 710.

Figure 7D:
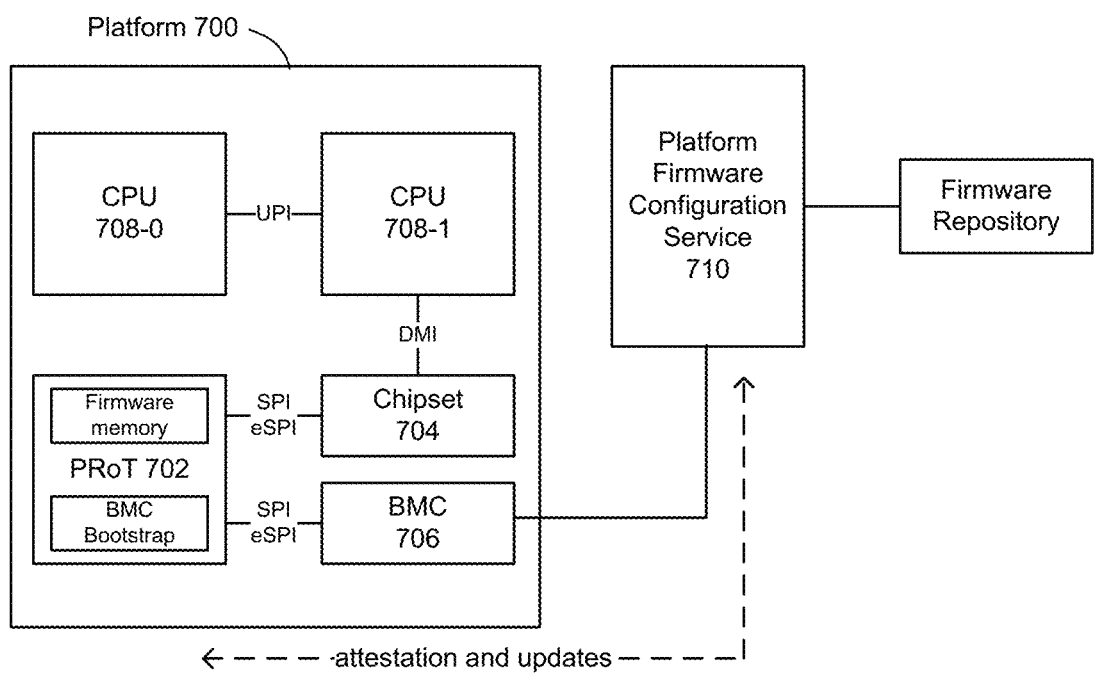

In the scenario of FIG. 7D, communication for attestation and update purposes between PRoT 702 and Platform Firmware Configuration Service 710 occurs. During runtime, a firmware update or other software can be sent by Platform Firmware Configuration Service 710 to PRoT 702 or other devices in platform 700 (e.g., CPU 708-0 or 708-1) for execution. At another reboot or other trigger or condition, a current firmware version or other software can be sent by Platform Firmware Configuration Service 710 to PRoT 702 or other devices in platform 700 (e.g., CPU 708-0 or 708-1) for execution.

Figure 8A:
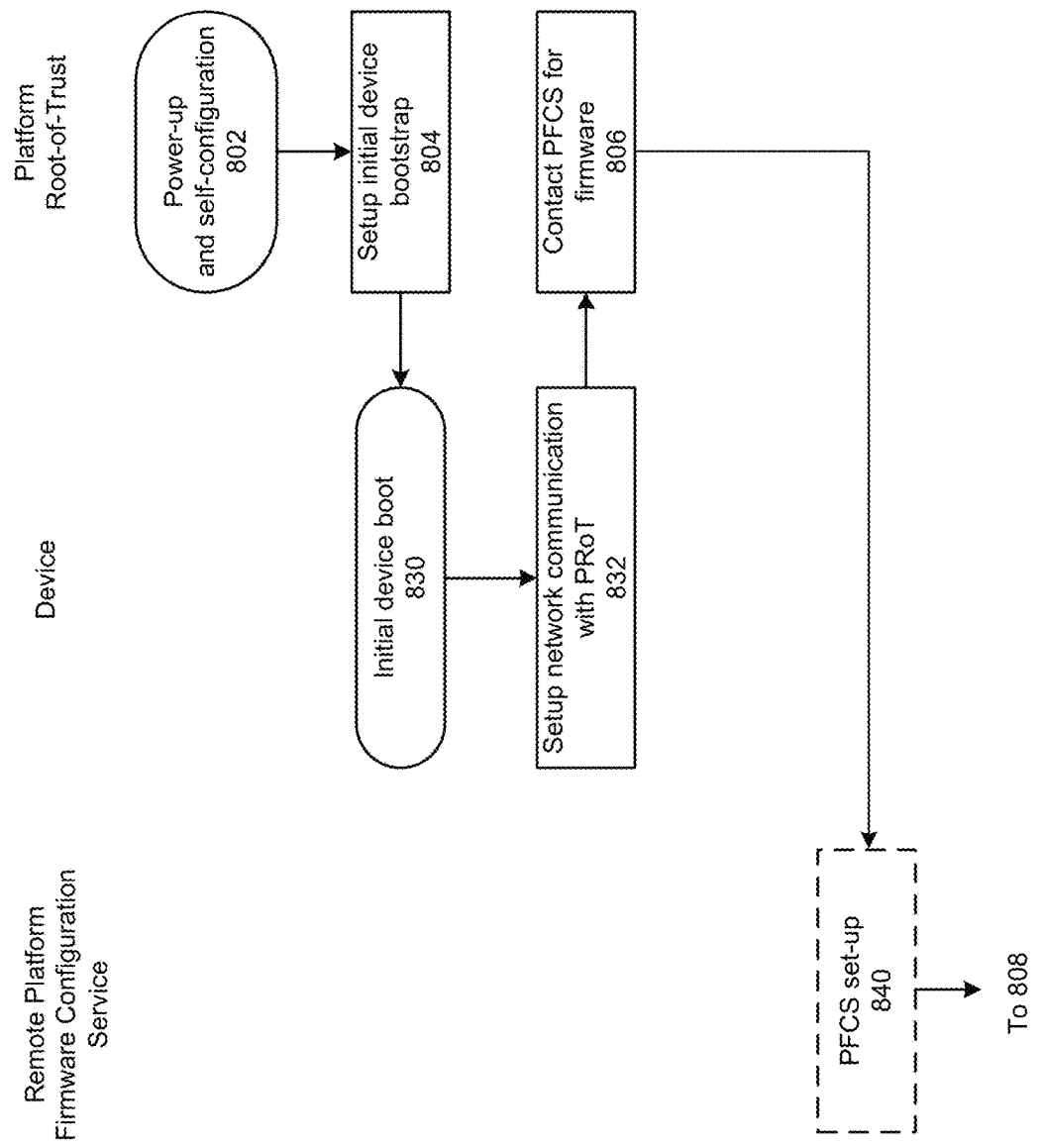
FIGS. 8A-8C depict a process for communications and activities across components to retrieve firmware or other software.
Figure 8B:
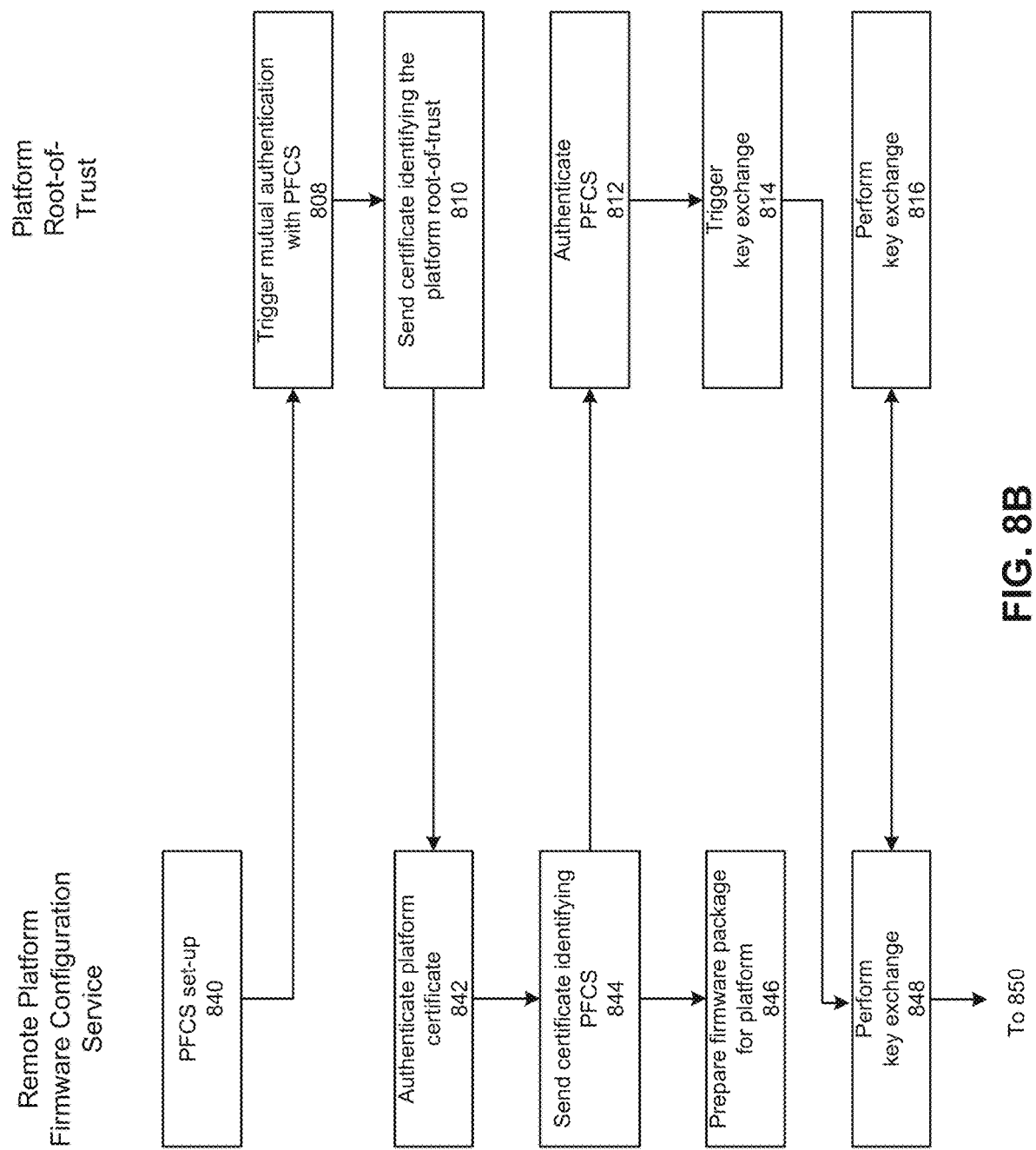
Figure 8C:
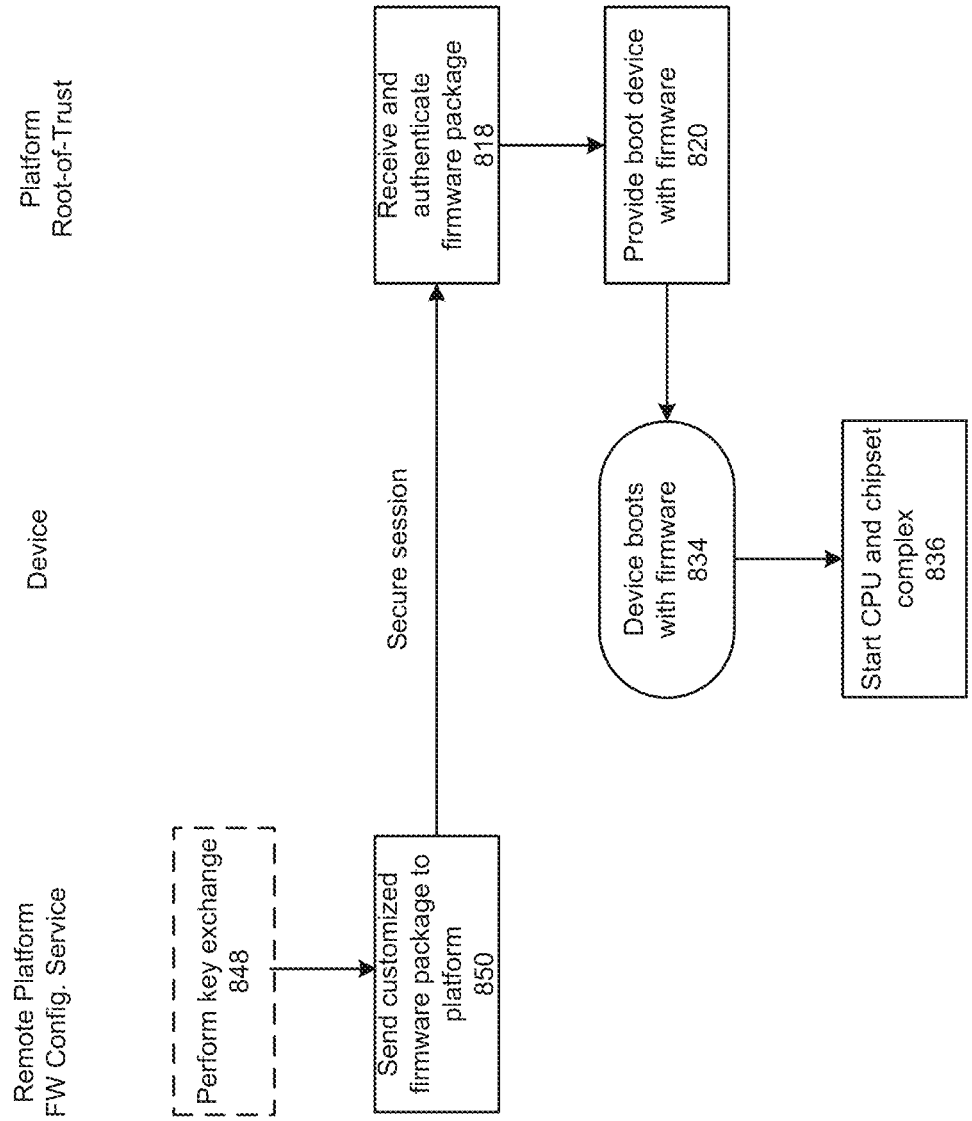

FIGS. 8A-8C depict a process for communications and activities across components to retrieve firmware or other software. FIG. 8A depicts an example of an initial platform power up or reboot process. The process can be performed by a device that is to execute a firmware. The device can request firmware at start-up, restart, reboot, or at any time or any configured trigger. At 802, a Platform Root-of-Trust performs power-up and self-configuration to prepare for configuration of firmware of a device. At 804, the Platform Root-of-Trust sets up an initial device bootstrap in order to provide initial firmware for the device to use at boot. At 830, the device uses the initial firmware to boot. In some examples, the initial firmware causes the device to request firmware from the Platform Root-of-Trust. In some examples, the device is a BMC, but any device can be configured to use the process described herein. For example, the device can include one or more of: a network interface, BMC, CPU, any peripheral device, and so forth. Multiple devices connected to the same platform can use a process to obtain firmware at the same or overlapping times or different times. At 832, the device sets up a network communication with the Platform Root-of-Trust to request firmware. The request can cause the Platform Root-of-Trust to send a communication to a remote platform firmware configuration service (PFCS) to initiate a retrieval of a firmware for the device to execute. The communication can be sent as one or more packets via a network or a bus or interconnect. At 806, the Platform Root-of-Trust contacts the PFCS to request generation of a firmware configuration for the device.

FIG. 8B depicts an example of a mutual authentication and secure session establishment between Platform Root-of-Trust and PFCS. At 840, PFCS can set-up to communicate with the Platform Root-of-Trust. At 808, Platform Root-of-Trust can trigger a mutual authentication with the PFCS and at 810, Platform Root-of-Trust can send a certificate identifying the platform root-of-trust to the remote PFCS. The certificate can be compatible with X.509 or other standards such as Simple Product Key Infrastructure (SPKI) or Pretty Good Privacy (PGP). An X.509 certificate can include a digital certificate that uses X.509 public key infrastructure (PKI) standard to verify that a public key belongs to the user.

At 842, the remote PFCS can authenticate the platform certificate received from the Platform Root-of-Trust. For example, authentication can include verifying if the certificate matches an expected certificate. At 844, the remote PFCS can send a certificate identifying the PFCS to the Platform Root-of-Trust. At 846, the remote PFCS can prepare firmware package for platform in case there is mutual authentication.

At 812, the Platform Root-of-Trust can authenticate the certificate received from the remote PFCS. For example, authentication can include verifying if the certificate matches an expected certificate. If the authentication passes, the process continues to 814. If authentication fails (not shown), however, the process can terminate and the device does not receive firmware from the Platform Root-of-Trust at least in this iteration of the process. An administrator can be alerted to take action and identify potentially malicious behavior to access a firmware or to update certificates used for authentication.

At 814, platform root-of-trust triggers a mutual key exchange with the remote PFCS whereby at 816 and 848, remote PFCS and Platform Root-of-Trust perform a mutual key exchange. Remote PFCS and Platform Root-of-Trust can perform key exchange with platform root of trust in order to update keys as some keys may expire or could be compromised. For example, elliptic-curve Diffie-Hellman (ECDH) key agreement protocol can be used where parties having an elliptic-curve public-private key pair to establish a shared secret. Other schemes can be used such as Triple Data Encryption Standard (3DES), Advanced Encryption Standard (AES), Digital Signature Algorithm (DSA), Rivest-Shamir-Adleman (RSA) algorithm, Elliptic Curve Digital Signature Algorithm (ECDSA), or others.

If the key exchange passes both remote PFCS and Platform Root-of-Trust, the process continues to 850. If authentication fails (not shown), however, the process can terminate and the device does not receive firmware from the Platform Root-of-Trust at least in this iteration of the process. As in the case for failure to validate a certificate, an administrator can be alerted to take action and identify potentially malicious behavior to access a firmware or to update keys used for authentication.

Referring to FIG. 8C, at 850, remote platform sends a potentially customized firmware package to Platform Root of Trust using a secure session. For example, the secure session can be enabled using the shared keys or through use of Secure Sockets Layer (SSL) or Transport Layer Security (TLS), or other secure communications protocol.

At 818, Platform Root of Trust receives and authenticates the firmware package using the shared key. If the firmware package is authenticated, at 820, Platform Root of Trust provides the firmware to the device. At 834, the device boots with the firmware. At 836, the CPU and chipset complex associated with the device can start with full firmware.

Figure 9:
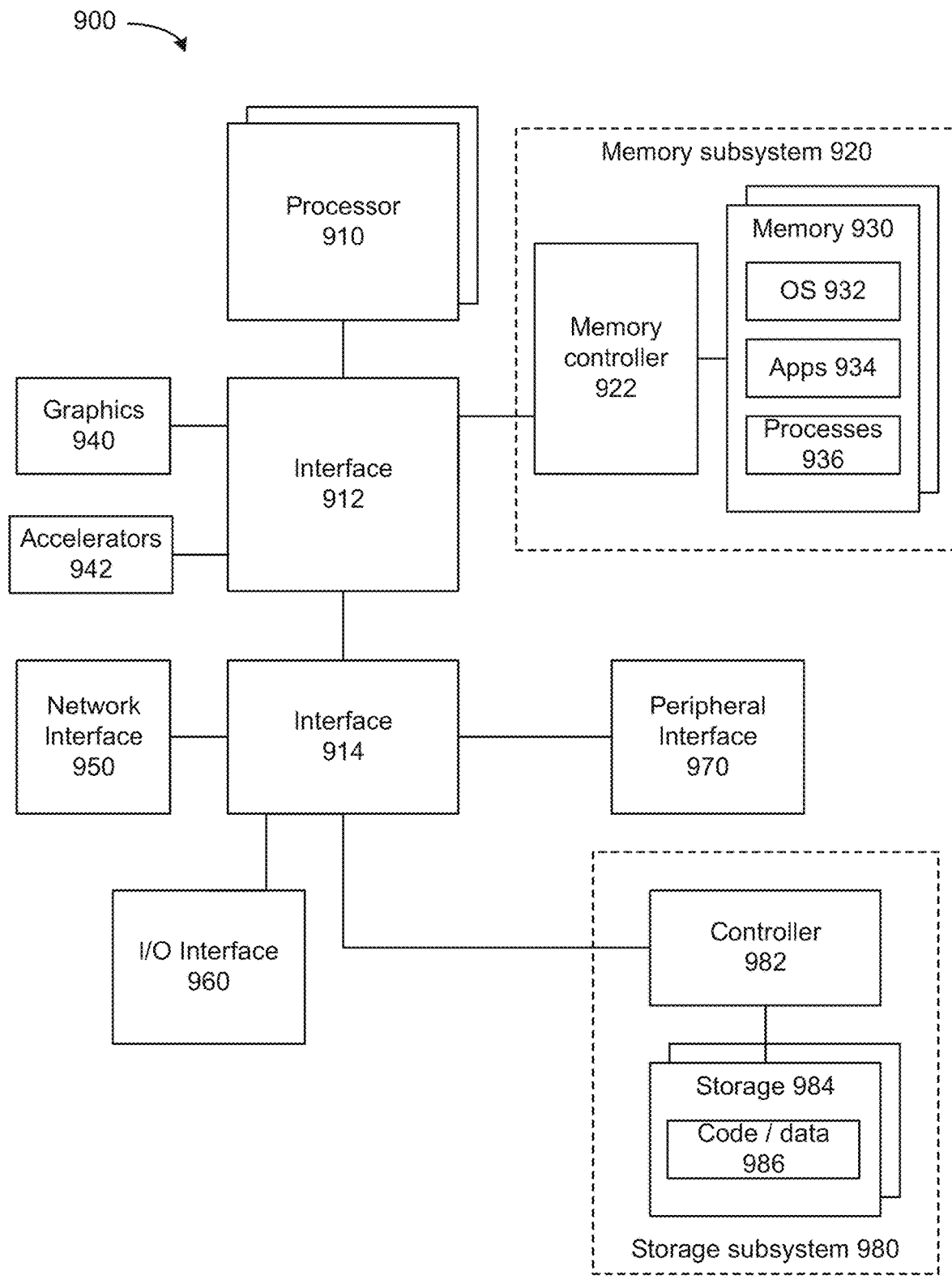
FIG. 9 depicts a system.

FIG. 9 depicts a system. The system can use embodiments described herein to perform firmware loading or updating. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), User Datagram Protocol (UDP), Transmission Control Protocol (TCP), User Datagram Protocol (UDP), quick User Datagram Protocol Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 10:
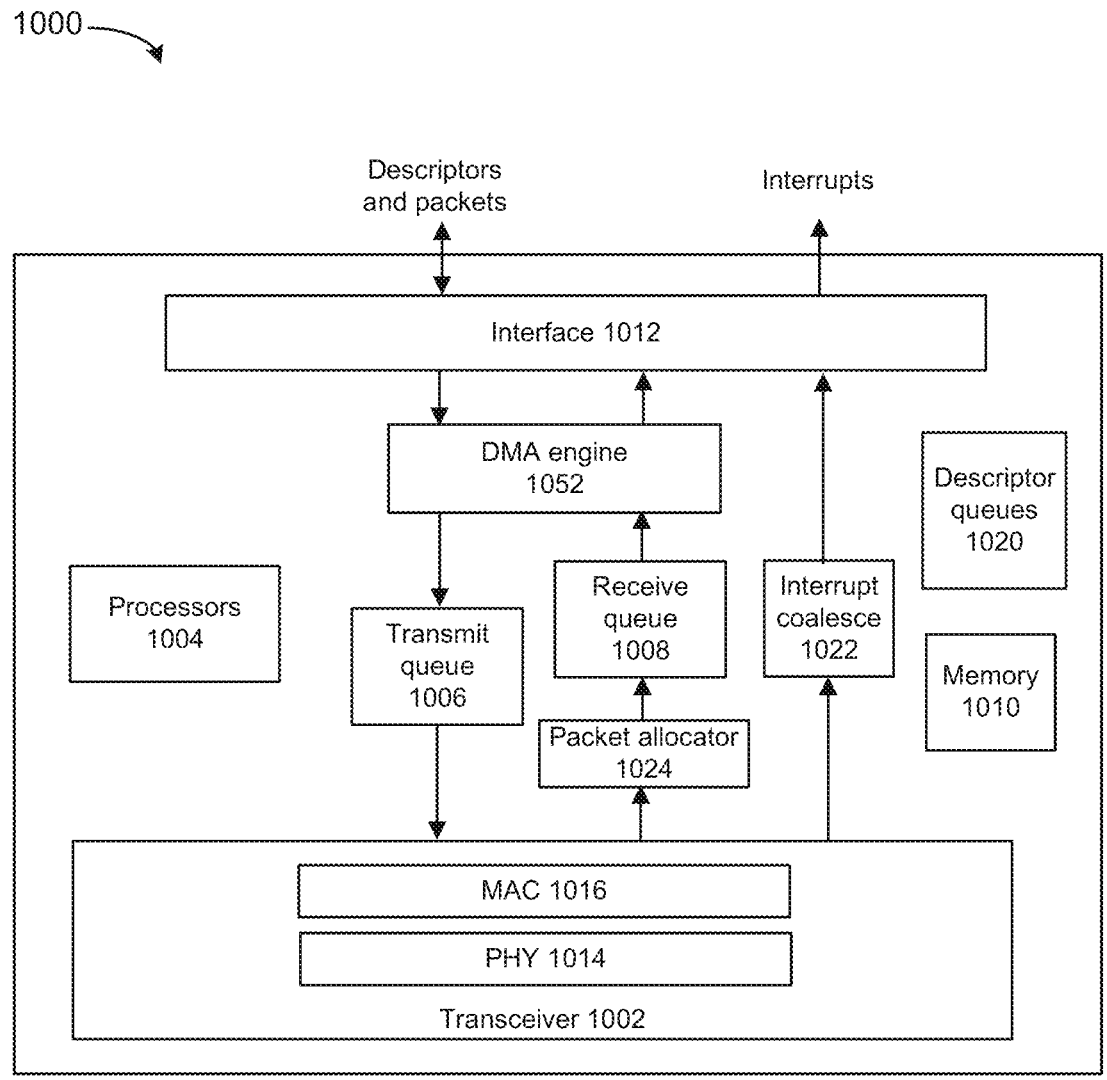
FIG. 10 depicts an example of a data center.

FIG. 10 depicts a network interface that can use embodiments or be used by embodiments. For example, various embodiments can use network interface to access firmware or update firmware. Network interface 1000 can include transceiver 1002, processors 1004, transmit queue 1006, receive queue 1008, memory 1010, and interface 1012, and DMA engine 1026. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include physical layer (PHY) circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to assemble data to be transmitted into packets, that include destination and source addresses along with network control information and error detection hash values. MAC circuitry 1016 can be configured to process MAC headers of received packets by verifying data integrity, removing preambles and padding, and providing packet content for processing by higher layers.

Processors 1004 can be any a combination of a: processor, core, graphics processing unit (GPU), field programmable gate array (FPGA), application specific integrated circuit (ASIC), or other programmable hardware device that allow programming of network interface 1000. For example, processors 1004 can provide for allocation or deallocation of intermediate queues. For example, a "smart network interface" can provide packet processing capabilities in the network interface using processors 1004.

Packet allocator 1024 can provide distribution of received packets for processing by multiple CPUs or cores using timeslot allocation described herein or RSS. When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1026 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Interface 1012 can provide an interface with host device (not depicted). For example, interface 1012 can be compatible with peripheral connect Peripheral Component Interconnect (PCI), PCI Express, PCI-x, Serial ATA (SATA), and/or Universal Serial Bus (USB) compatible interface (although other interconnection standards may be used).

Figure 11:
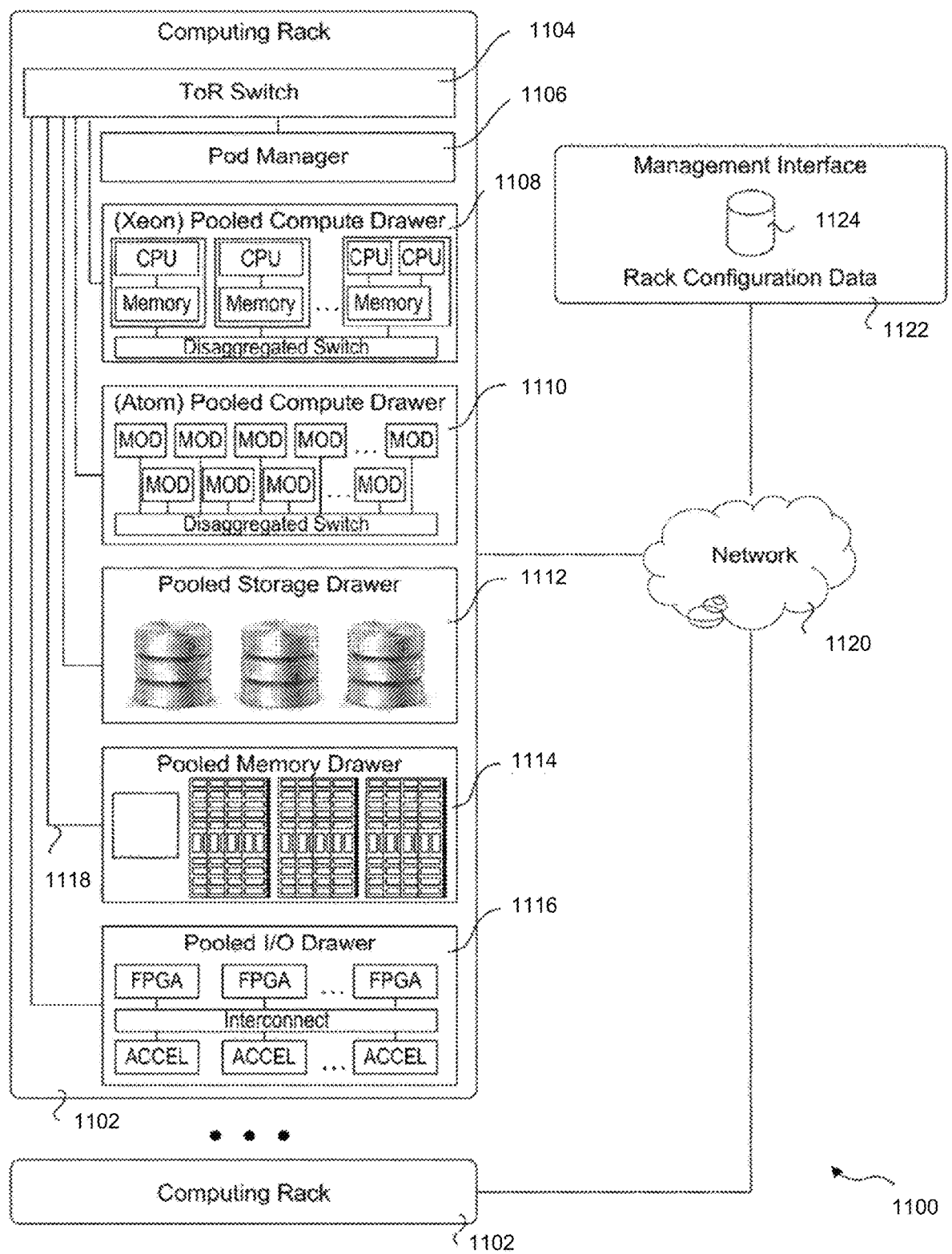
FIG. 11 depicts an environment.

FIG. 11 depicts an environment 1100 includes multiple computing racks 1102, some including a Top of Rack (ToR) switch 1104, a pod manager 1106, and a plurality of pooled system drawers. Various embodiments can be used to update firmware elements of components of environment 1100 in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a method comprising: at a network interface, receiving a firmware update for a network interface in one or more packets.

Example 2 includes any example, and includes authenticating the firmware update and based on authentication of the firmware update, permitting a firmware update of the network interface.

Example 3 includes any example, and includes at the network interface, receiving a firmware update for a device in one or more packets, wherein the device comprises one or more of: Board Management Controller (BMC), central processing unit (CPU), storage controller, memory controller, display engine, graphics processing unit (GPU), accelerator device, or peripheral device; authenticating the firmware update for the device; and based on authentication of the firmware update for the device, permitting a firmware update of the device.

Example 4 includes any example, and includes indicating a status of the firmware update as either successful or unsuccessful at a network address.

Example 5 includes any example, and includes storing the firmware update in a firmware memory region for access; selecting a second interface for use to access the firmware update and connection to a network interface port; and de-selecting a first interface that uses a current firmware from connection to the network interface port.

Example 6 includes any example, and includes maintaining communication using the network interface port during a firmware change.

Example 7 includes any example, wherein the network interface port is allocated for manageability communications, the manageability communications comprising one or more of: heartbeat packets, probe messages, telemetry collection, and various keep alive packets, Address Resolution Protocol (ARP) messages, acknowledgements (ACKs), or neighbor solicitation.

Example 8 includes any example, and includes initiating transmission of a firmware update from a remote trusted source; and storing the received firmware update into a volatile memory device.

Example 9 includes any example, and includes one or more devices accessing firmware from the volatile memory device, the one or more devices comprising: a Board Management Controller (BMC), central processing unit (CPU), the network interface, storage controller, memory controller, display engine, graphics processing unit (GPU), accelerator device, or peripheral device.

Example 10 includes any example, and includes erasing the firmware update from the volatile memory device based on removal of power to the volatile memory device.

Example 11 includes any example, and includes an apparatus that includes a network interface to receive a firmware update for the network interface from one or more packets.

Example 12 includes any example, and includes at least one processor to: authenticate a firmware update and based on authentication of the firmware update, permit a firmware update of the network interface.

Example 13 includes any example, and includes at least one processor and wherein at the network interface, receive a firmware update for a device in one or more packets, wherein the device comprises one or more of: Board Management Controller (BMC), central processing unit (CPU), storage controller, memory controller, display engine, graphics processing unit (GPU), accelerator device, or peripheral device; the at least one processor is to authenticate the firmware update for the device; and based on authentication of the firmware update for the device, the at least one processor is to permit a firmware update of the device.

Example 14 includes any example, and includes at least one processor to: indicate a status of the firmware update as either successful or unsuccessful at a network address.

Example 15 includes any example, and includes at least one processor to: store the firmware update in a firmware memory region for access; select a second interface for use to access the firmware update and connection to a network interface port; and de-select a first interface that uses a current firmware from connection to the network interface port.

Example 16 includes any example, wherein the network interface is to maintain communication using the network interface port during a firmware change.

Example 17 includes any example, wherein the port is allocated for manageability communications, the manageability communications comprising one or more of: heartbeat packets, probe messages, telemetry collection, and various keep alive packets, Address Resolution Protocol (ARP) messages, acknowledgements (ACKs), or neighbor solicitation.

Example 18 includes any example, and includes at least one processor to: initiate transmission of a firmware update from a remote trusted source; and store the received firmware update into a volatile memory device.

Example 19 includes any example, wherein one or more devices are to access firmware from the volatile memory device, the one or more devices comprising: a Board Management Controller (BMC), central processing unit (CPU), the network interface, a storage controller, memory controller, display engine, graphics processing unit (GPU), accelerator device, or peripheral device.

Example 20 includes any example, wherein the firmware update is erased from the volatile memory device based on removal of power to the volatile memory device.

Example 21 includes any example, and includes a server, data center, or rack.

What is claimed is:

1. A method comprising:
   at a network interface, receiving a firmware update for the network interface in one or more packets;
   storing the firmware update in a firmware memory region for access;
   selecting a first interface for use to access the firmware update and connect to a network interface port; and
   de-selecting a second interface that uses a current firmware from connection to the network interface port.

2. The method of claim 1, comprising:
   authenticating the firmware update and
   based on authentication of the firmware update, permitting the firmware update of the network interface.

3. The method of claim 1, comprising:
   at the network interface, receiving the firmware update for a device in one or more packets, wherein the device comprises one or more of: a Board Management Controller (BMC), a central processing unit (CPU), a storage controller, a memory controller, a display engine, a graphics processing unit (GPU), an accelerator device, or a peripheral device;
   authenticating the firmware update for the device; and
   based on authentication of the firmware update for the device, permitting a firmware update of the device.

4. The method of claim 1, comprising:
   indicating a status of the firmware update as either successful or unsuccessful at a network address.

5. The method of claim 1, comprising maintaining communication using the network interface port during a firmware change.

6. The method of claim 1, wherein the network interface port is allocated for manageability communications, the manageability communications comprising one or more of: heartbeat packets, probe messages, telemetry collection, and various keep alive packets, Address Resolution Protocol (ARP) messages, acknowledgements (ACKs), or neighbor solicitation.

7. The method of claim 1, comprising:
   initiating transmission of the firmware update from a remote trusted source; and
   storing the received firmware update into a volatile memory device.

8. The method of claim 7, comprising:
   one or more devices accessing firmware from the volatile memory device, the one or more devices comprising one or more of: a Board Management Controller (BMC), a central processing unit (CPU), the network interface, a storage controller, a memory controller, a display engine, a graphics processing unit (GPU), an accelerator device, or a peripheral device.

9. The method of claim 7, comprising:
   erasing the firmware update from the volatile memory device based on removal of power from the volatile memory device.

10. An apparatus comprising:
    a network interface comprising an interface and circuitry to:
      receive a firmware update for the network interface from one or more packets store the firmware update in a firmware memory region for access;
      select a first interface for use to access the firmware update and connect to a network interface port; and
      de-select a second interface that uses a current firmware from connection to the network interface port.

11. The apparatus of claim 10, comprising at least one processor to:
    authenticate the firmware update and
    based on authentication of the firmware update, permit an update of firmware of the network interface.

12. The apparatus of claim 10, comprising at least one processor and wherein
    the network interface is to receive the firmware update for a device in one or more packets, wherein the device comprises one or more of: a Board Management Controller (BMC), a central processing unit (CPU), a storage controller, a memory controller, a display engine, a graphics processing unit (GPU), an accelerator device, or a peripheral device;
    the at least one processor is to authenticate the firmware update for the device; and
    based on authentication of the firmware update for the device, the at least one processor is to permit a firmware update of the device.

13. The apparatus of claim 10, comprising at least one processor to:
    indicate a status of the firmware update as either successful or unsuccessful at a network address.

14. The apparatus of claim 10, wherein the network interface is to maintain communication using the network interface port during a change of firmware.

15. The apparatus of claim 10, wherein the network interface port is allocated for manageability communications, the manageability communications comprising one or more of: heartbeat packets, probe messages, telemetry collection, and various keep alive packets, Address Resolution Protocol (ARP) messages, acknowledgements (ACKs), or neighbor solicitation.

16. The apparatus of claim 10, comprising at least one processor to:
    initiate transmission of the firmware update from a remote trusted source; and
    store the received firmware update into a volatile memory device.

17. The apparatus of claim 16, wherein one or more devices are to access the firmware update from the volatile memory device, the one or more devices comprising: a Board Management Controller (BMC), a central processing unit (CPU), the network interface, a storage controller, a memory controller, a display engine, a graphics processing unit (GPU), an accelerator device, or a peripheral device.

18. The apparatus of claim 17, comprising circuitry to erase the firmware update from the volatile memory device based on removal of power to the volatile memory device.

19. The apparatus of claim 10, comprising a server, data center, or rack, wherein the server, data center, or rack are coupled to the network interface and wherein the server, data center, or rack comprise circuitry to utilize the firmware update.

* * * * *